(12) United States Patent
Seko et al.

(10) Patent No.: US 10,234,610 B2
(45) Date of Patent: Mar. 19, 2019

(54) OPTICAL ELEMENT

(71) Applicant: HAMAMATSU PHOTONICS K.K., Hamamatsu-shi, Shizuoka (JP)

(72) Inventors: Takafumi Seko, Hamamatsu (JP); Masaomi Takasaka, Hamamatsu (JP); Hiroshi Okamoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/327,089

(22) PCT Filed: Jul. 10, 2015

(86) PCT No.: PCT/JP2015/069890
§ 371 (c)(1),
(2) Date: Jan. 18, 2017

(87) PCT Pub. No.: WO2016/013425
PCT Pub. Date: Jan. 28, 2016

(65) Prior Publication Data
US 2017/0160451 A1    Jun. 8, 2017

(30) Foreign Application Priority Data

Jul. 23, 2014  (JP) ................................ 2014-149561

(51) Int. Cl.
*G02B 5/04* (2006.01)
*G02B 5/28* (2006.01)
(Continued)

(52) U.S. Cl.
CPC .................. *G02B 5/28* (2013.01); *G02B 1/11* (2013.01); *G02B 5/04* (2013.01); *G02B 5/045* (2013.01);
(Continued)

(58) Field of Classification Search
CPC ................ G02B 27/2214; G02B 27/22; G02B 27/0101; G02B 27/0172; G02B 17/086;
(Continued)

(56) References Cited

U.S. PATENT DOCUMENTS 4,964,707 A * 10/1990 Hayashi ................. G02B 21/14
359/371
7,903,338 B1 * 3/2011 Wach ..................... G02B 5/289
359/588

(Continued)

FOREIGN PATENT DOCUMENTS

CN         101082679 A    12/2007
CN         102141641 A     8/2011
(Continued)

OTHER PUBLICATIONS

International Preliminary Report on Patentability dated Feb. 2, 2017 for PCT/JP2015/069890.

*Primary Examiner* — William R Alexander
*Assistant Examiner* — Henry A Duong
(74) *Attorney, Agent, or Firm* — Drinker Biddle & Reath LLP

(57) ABSTRACT

An optical element includes an optical block through which object light is transmitted along a light transmission axis direction, a first wavelength selection filter provided on a first filter surface set such that a normal line forms an angle α with the light transmission axis, and a second wavelength selection filter located on a rear side with respect to the first wavelength selection filter, and provided on a second filter surface set such that a normal line forms an angle α with the light transmission axis, the second filter surface being in non-parallel, having an opposite inclination direction, and forming an angle 2α with the first filter surface. The optical block is constituted by combining an incidence-side block,
(Continued)

a first filter block, a second filter block, and an emission-side block, formed of the same material and in the same shape.

6 Claims, 19 Drawing Sheets

(51) Int. Cl.
*G02B 26/02* (2006.01)
*G02B 1/11* (2015.01)
*G02B 26/00* (2006.01)
*G02B 1/115* (2015.01)

(52) U.S. Cl.
CPC ............ *G02B 5/285* (2013.01); *G02B 26/007* (2013.01); *G02B 26/02* (2013.01); *G02B 1/115* (2013.01)

(58) Field of Classification Search
CPC .......... G02B 27/106; G02B 2027/0134; G02B 2027/011; G02B 2027/0132; G02B 5/28; G02B 26/007; G02B 5/285; G02B 5/045; G02B 5/04; G02B 1/11; G02B 26/02; G02B 1/115; G02B 6/29356; G02B 6/29358; G02B 27/10; G02B 27/144; H04N 13/0404; H04N 13/0497; H04N 13/0409; H04N 13/0055; H04N 13/044; H04N 13/0436
USPC .......................................................... 359/462
See application file for complete search history.

(56) References Cited

U.S. PATENT DOCUMENTS

2003/0012230 A1* 1/2003 Hopkins ................. H01S 5/141
372/20
2017/0038509 A1* 2/2017 Iwamoto .................. G02B 1/11

FOREIGN PATENT DOCUMENTS

| | | |
|---|---|---|
| EP | 2859867 | 4/2015 |
| JP | H2-151825 A | 6/1990 |
| JP | H10-300915 A | 11/1998 |
| JP | 2005-062238 A | 3/2005 |
| JP | 2007-101621 A | 4/2007 |
| JP | 2009-168940 A | 7/2009 |
| JP | 2009-290414 A | 12/2009 |
| JP | 2011-090154 A | 5/2011 |
| JP | 5775621 B1 | 9/2015 |

* cited by examiner

Fig.12
(a)
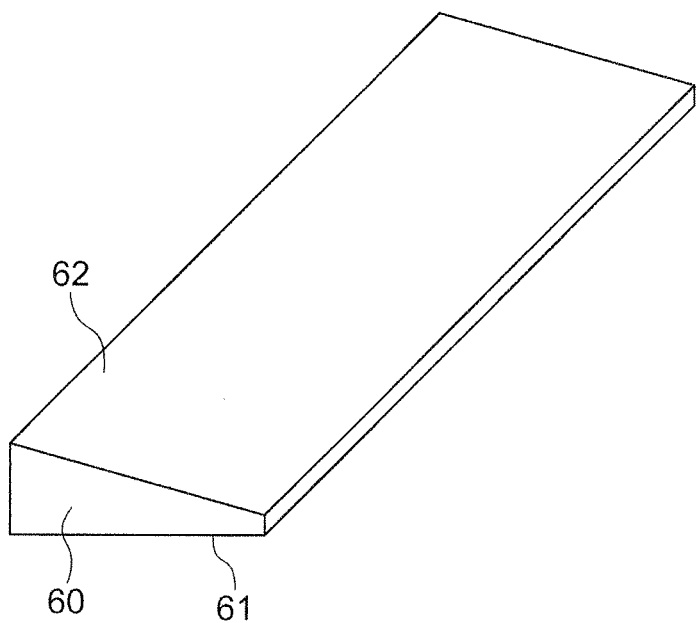
(b)
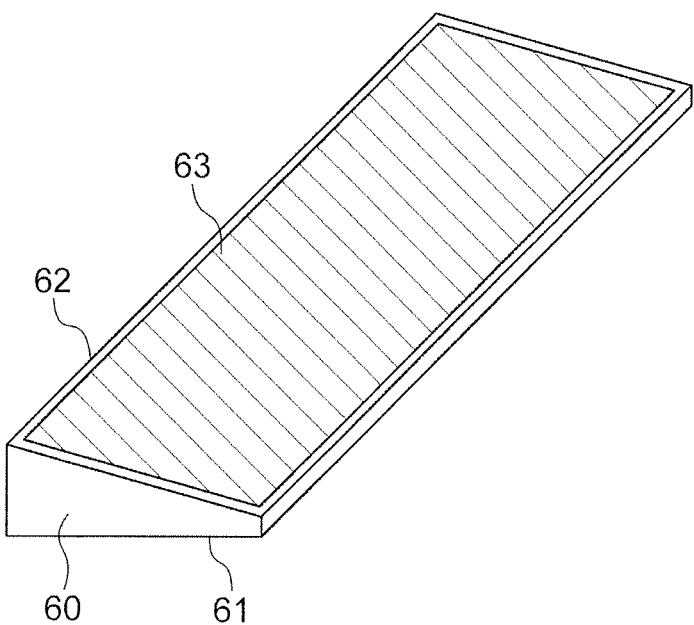

Fig.13
(a)
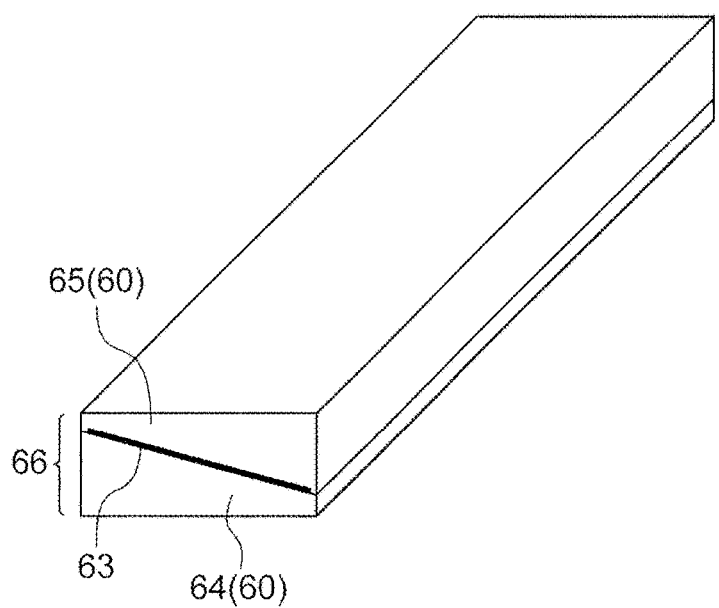
(b)
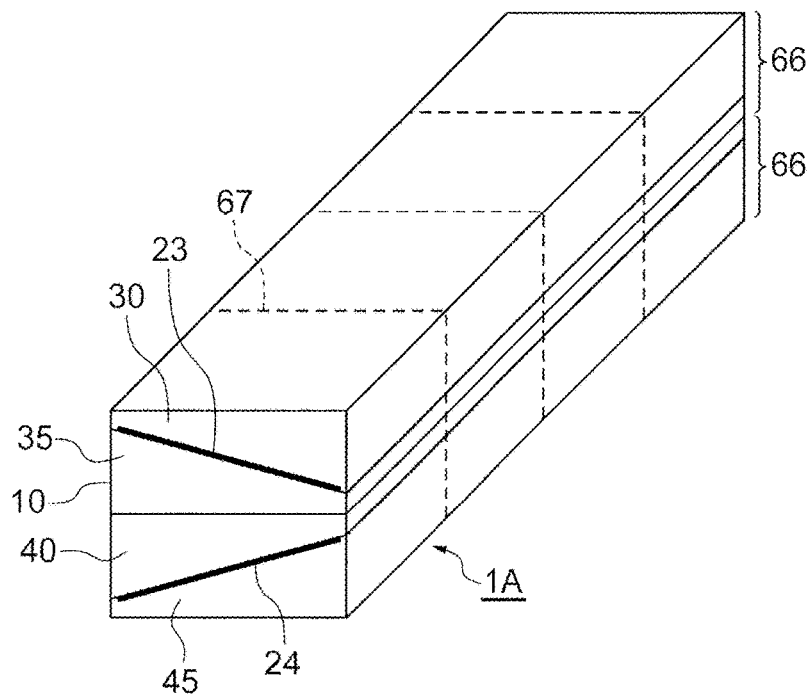

Fig.16
(a)
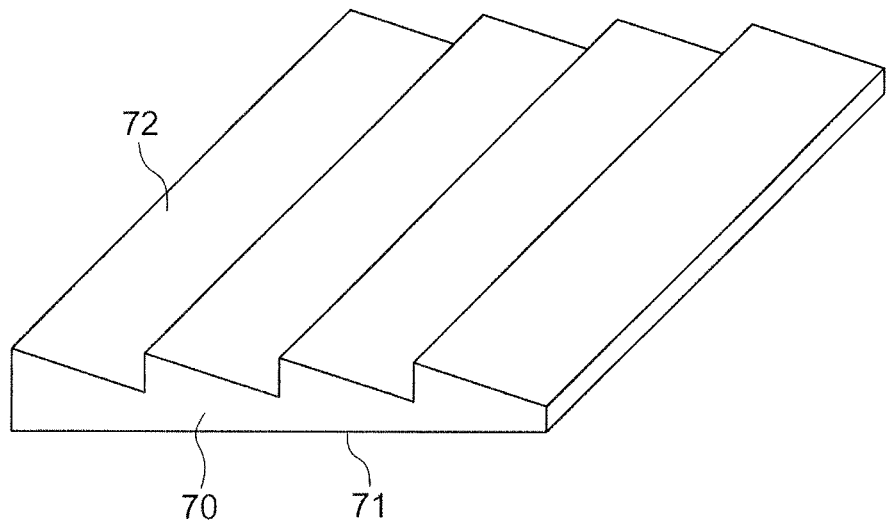
(b)
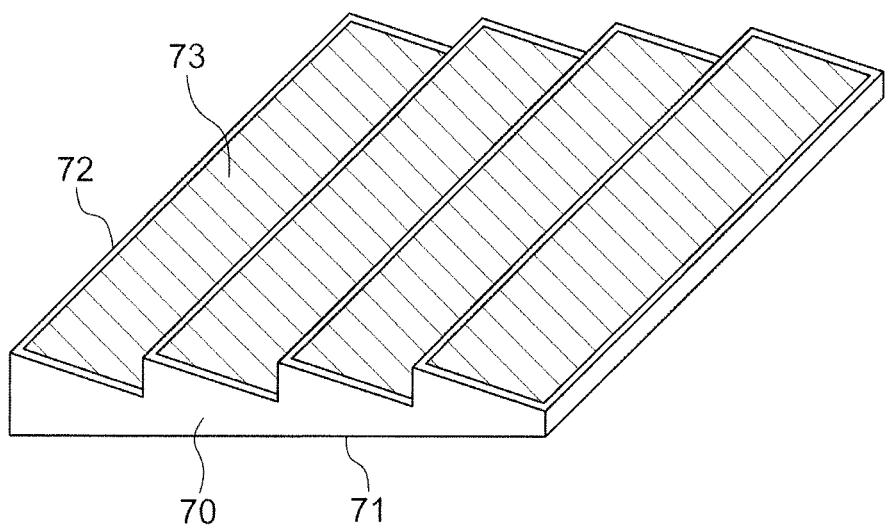

Fig.17
(a)
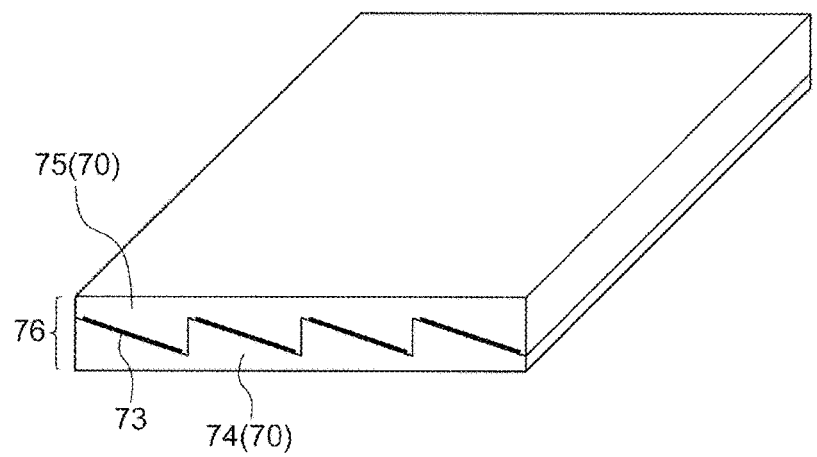
(b)
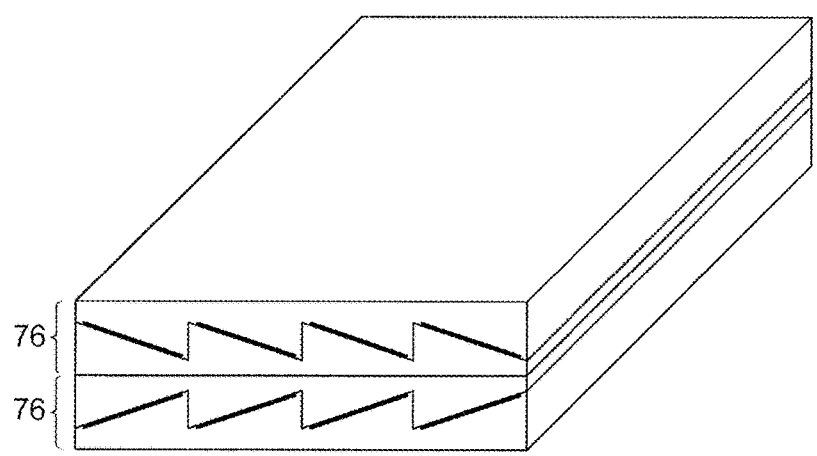

*Fig.18*
(a)
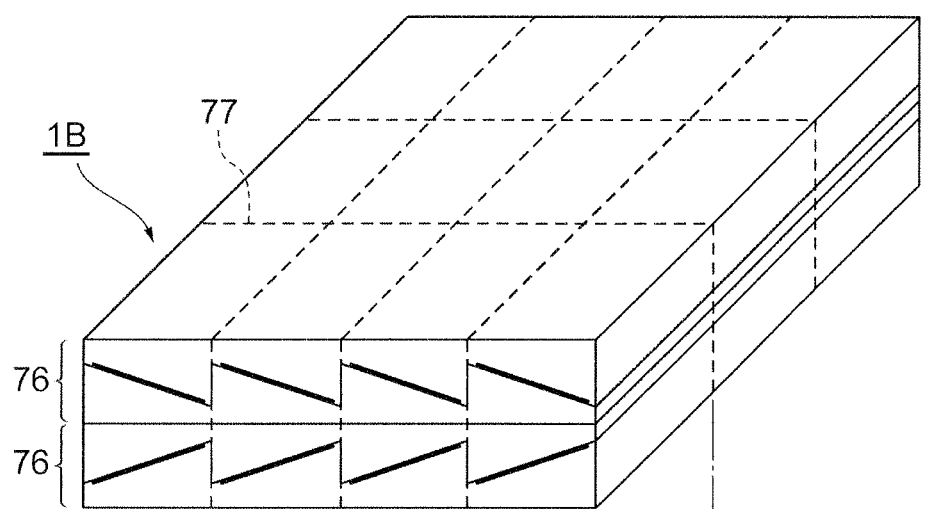
(b)
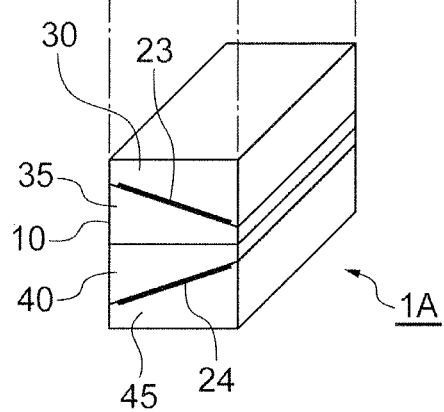

Fig.19
(a)
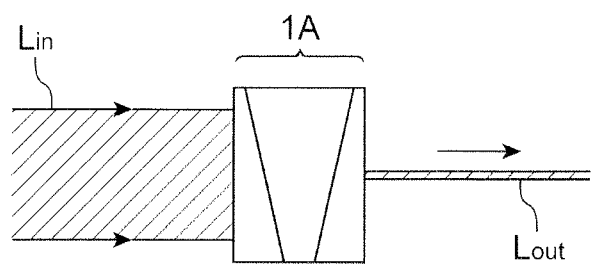
(b)
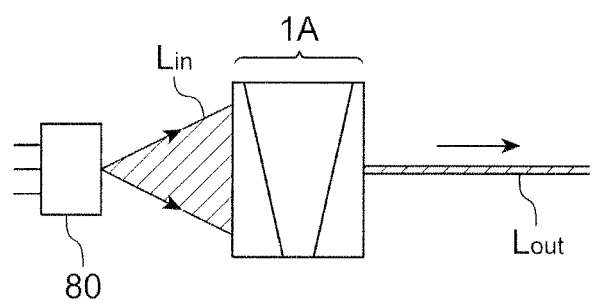
(c)
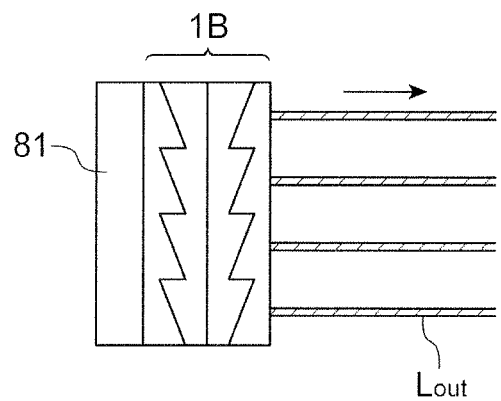
(d)
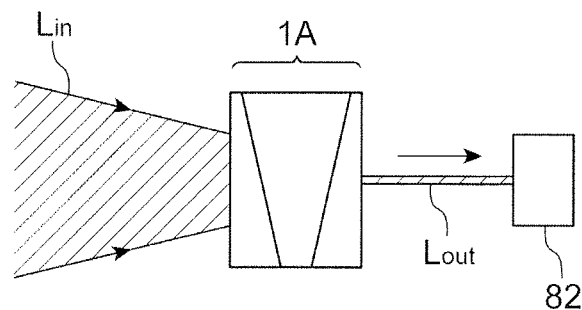

OPTICAL ELEMENT

TECHNICAL FIELD

The present invention relates to an optical element which controls transmission conditions for object light.

BACKGROUND ART

As an optical element for diffused light such as scattered light from a scattered light source as object light to be controlled, controlling transmission conditions for the object light so as to selectively pick up, from the object light, a light component with a particular wavelength range and a particular incident angle, and the like, for example, a band-pass filter, which is an interference filter using a dielectric multilayer film, is used (for example, see Patent Documents 1 and 2).

CITATION LIST

Patent Literature

Patent Document 1: Japanese Patent Application Laid-Open Publication No. H10-300915
Patent Document 2: Japanese Patent Application Laid-Open Publication No. 2009-290414

SUMMARY OF INVENTION

Technical Problem

It is difficult to selectively pick up, from diffused light, a light component with a particular wavelength range and incident angle by an optical element. For example, when a light component with a particular wavelength range is picked up from diffused light as object light using the above-described band-pass filter, the diffused light includes various angle components, which is a problem. This is because a dielectric multilayer film included in the band-pass filter exhibits an angle dependency in the wavelength properties of light transmission, and therefore, a wavelength range of a transmission band or a reflection band varies depending on an incident angle of light. Accordingly, when using the band-pass filter for the diffused light, a configuration of an optical system becomes complicated, for example, by providing a collimator before the filter.

Specifically, examples of possible use of picking up of the light component with a particular wavelength range and incident angle from the diffused light include use in filtering of a semiconductor laser (LD), a laser radar system, and a laser ranging system. In such cases, an optical element obtained by combining a plurality of lenses and optical components has been conventionally used, however, in recent years, with the use thereof widened variously, such as mounting to an automobile or the like, and application to a compact laser, an optical element is demanded which is highly reliable in terms of environmental resistance, vibration resistance, and the like, has a simple configuration, and is inexpensive.

The present invention has been made in order to solve the above problem, and an object thereof is to provide an optical element which is highly reliable in terms of environmental resistance and the like, capable of controlling transmission conditions for object light with a simple configuration.

Solution to Problem

In order to achieve the above object, an optical element according to the present invention includes (1) an optical block through which object light for transmission condition control is transmitted along a light transmission axis direction, (2) a first wavelength selection filter including an interference filter provided on a first filter surface set such that a normal line forms an angle $\alpha$ with the light transmission axis, inside the optical block, and (3) a second wavelength selection filter being located on a rear side of the light transmission axis with respect to the first wavelength selection filter, and including an interference filter provided on a second filter surface set such that a normal line forms an angle $2\alpha$ with the light transmission axis, the second filter surface being in non-parallel, having an opposite inclination direction, and forming an angle $2\alpha$ with the first filter surface, inside the optical block, and (4) the optical block is constituted by combining four blocks of an incidence-side block, a first filter block, a second filter block, and an emission-side block in this order from a front side of the light transmission axis, and the four blocks are blocks of the same material and in the same shape formed such that each of the blocks has a first surface and a second surface opposed to each other, and the normal line of the second surface forms an angle $\alpha$ with the light transmission axis, (5) the first surface of the incidence-side block is a light incident surface, the second surface of the incidence-side block is connected to the second surface of the first filter block, the first surface of the first filter block is connected to the first surface of the second filter block, the second surface of the second filter block is connected to the second surface of the emission-side block, and the first surface of the emission-side block is a light emitting surface, (6) the first wavelength selection filter is formed on the second surface of the first filter block or on the second surface of the incidence-side block, and the second wavelength selection filter is formed on the second surface of the second filter block or on the second surface of the emission-side block.

In the optical element described above, the optical block, including a material which transmits object light with a predetermined wavelength, the first wavelength selection filter and the second wavelength selection filter, being two interference filters for wavelength selection integrally provided inside the optical block, constitute the optical element using a predetermined axis in the optical block as a light transmission axis (optical axis). Further, regarding an arrangement configuration of the first and second wavelength selection filters with respect to the optical block, the first wavelength selection filter is disposed on the first filter surface having the normal line forming the angle $\alpha$ with the light transmission axis, and the second wavelength selection filter is disposed on the second filter surface having the normal line forming the angle $\alpha$ with the light transmission axis, the second filter surface being in non-parallel, having the opposite inclination direction, and forming the angle $2\alpha$ with the first filter surface.

By disposing and fixing the first and second wavelength selection filters inside the optical block so as to form the angle $2\alpha$ with each other as described above, an optical element is realized which is highly reliable in terms of environmental resistance and the like and capable of stably controlling transmission conditions for the object light. In addition, by combining and using wavelength properties in light transmission in each of the first and second wavelength selection filters disposed in non-parallel with each other, control of the transmission conditions for the object light can be preferably realized, for example, by selectively transmitting a light component of the object light having a particular wavelength range and incident angle, based on a difference in an angle dependency of light transmission properties between the first and second wavelength selection filters exhibited when changing an incident angle of the object light.

In addition, in the optical element of the above configuration, the optical block in which the first and second wavelength selection filters are integrally provided is configured to include, specifically, four blocks of the incidence-side block, the first filter block, the second filter block, and the emission-side block, which are formed of the same material and in the same shape. Further, in the optical block of the above configuration, the first surface of the incidence-side block is a light incident surface, the second surface of the incidence-side block is connected to the second surface of the first filter block, the first surface of the first filter block is connected to the first surface of the second filter block, the second surface of the second filter block is connected to the second surface of the emission-side block, and the first surface of the emission-side block is a light emitting surface.

Further, in the above configuration, the first wavelength selection filter is provided using a connection surface between the second surface of the first filter block and the second surface of the incidence-side block as the first filter surface set inside the optical block, and the second wavelength selection filter is provided using a connection surface between the second surface of the second filter block and the second surface of the emission-side block as the second filter surface set inside the optical block. As described above, by constituting the optical block which supports the first and second wavelength selection filters with the four blocks of the same material and in the same shape as constitutional components, it is possible to realize an optical element which has a simple configuration and high mass-productivity, and is inexpensive.

Advantageous Effects of Invention

With the optical element of the present invention, it is possible to increase reliability in terms of environmental resistance and the like, and to control transmission conditions for object light with a simple configuration, by constituting the optical element with the optical block through which the object light is transmitted and the first and second wavelength selection filters integrally provided inside the optical block, disposing the first wavelength selection filter on the first filter surface having the normal line forming the angle α with the light transmission axis, disposing the second wavelength selection filter on the second filter surface having the normal line forming the angle α with the light transmission axis, the second filter surface being in non-parallel, having the opposite inclination direction, and forming the angle 2α with the first filter surface, and combining the incidence-side block, the first filter block, the second filter block, and the emission-side block, which are formed of the same material and in the same shape, to constitute the optical block.

BRIEF DESCRIPTION OF DRAWINGS

FIG. 12 includes (a), (b) views illustrating an example of a method for manufacturing the optical element.

FIG. 13 includes (a), (b) views illustrating the example of the method for manufacturing the optical element.

FIG. 16 includes (a), (b) views illustrating another example of the method for manufacturing the optical element.

FIG. 17 includes (a), (b) views illustrating the other example of the method for manufacturing the optical element.

FIG. 18 includes (a), (b) views illustrating the other example of the method for manufacturing the optical element.

FIG. 19 includes (a)-(d) views illustrating examples of use of the optical element as an aperture.

DESCRIPTION OF EMBODIMENTS

Figure 1:
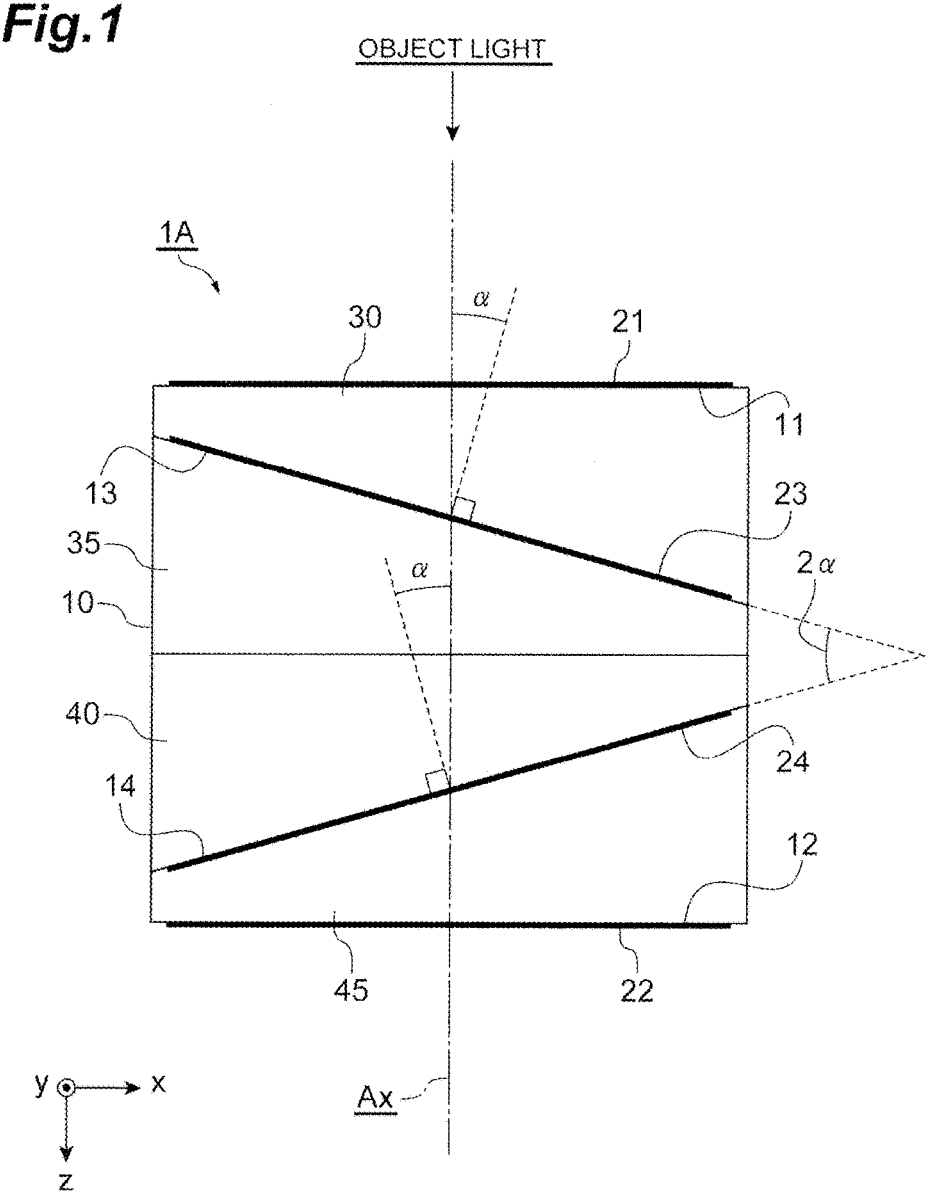
FIG. 1 is a side view illustrating a configuration of an optical element of an embodiment.

Hereinafter, an embodiment of the optical element according to the present invention will be described in detail with reference to the drawings. In the description of the drawings, the same reference signs will be attached to the same elements, without redundant description. The dimensional ratios in the drawings are not always coincident with those in the description.

Figure 2:
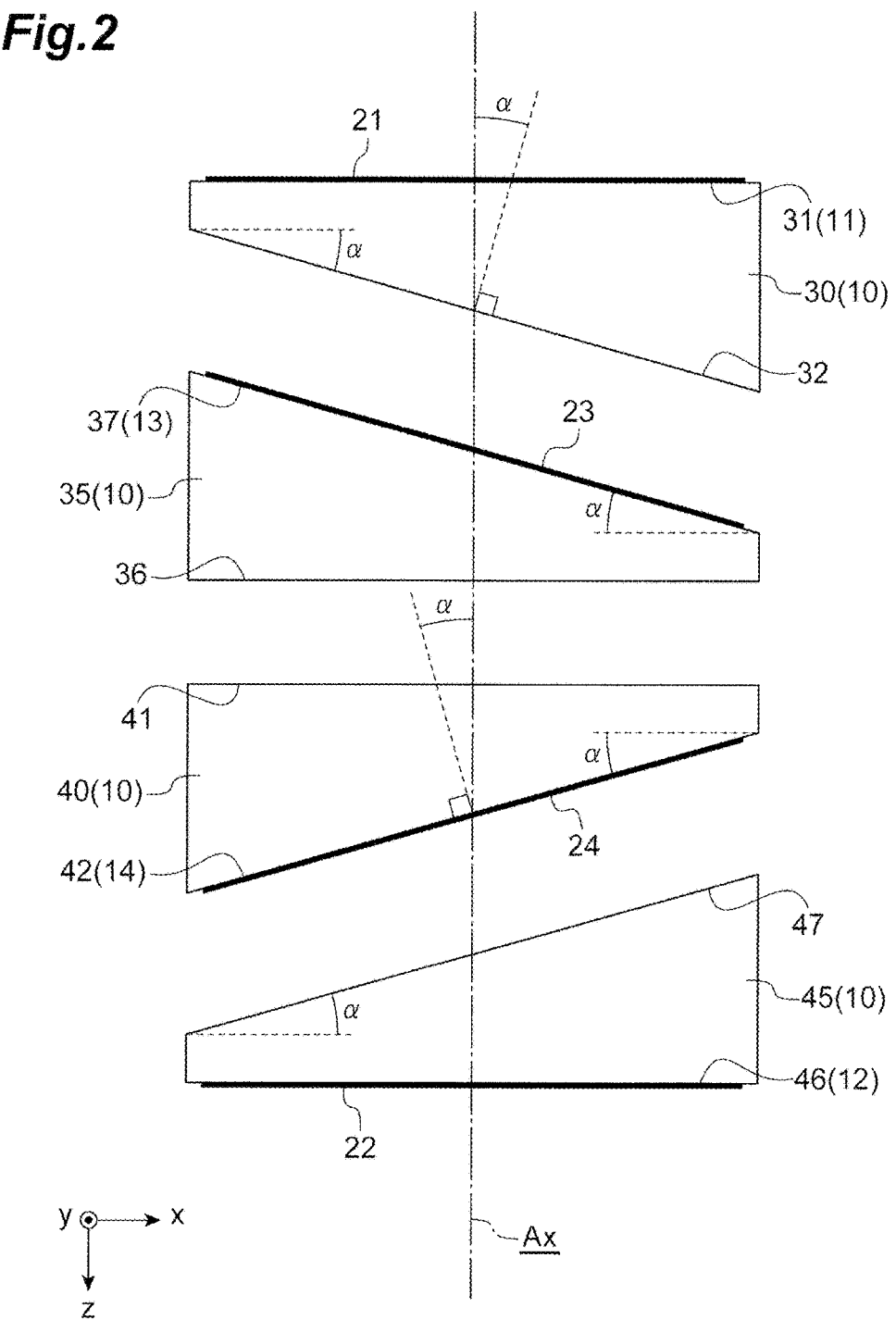
FIG. 2 is an exploded side view illustrating four blocks constituting an optical block used in the optical element illustrated in FIG. 1.
Figure 3:
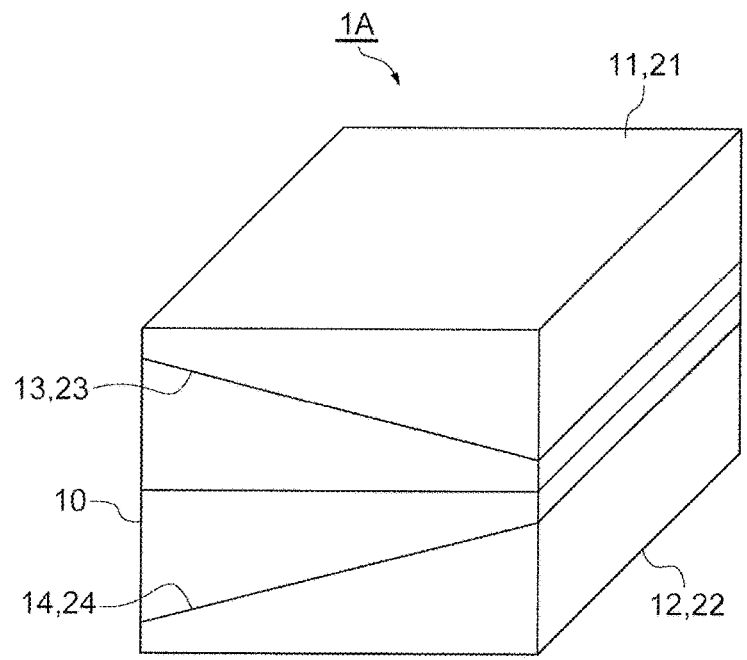
FIG. 3 is a perspective view illustrating the configuration of the optical element illustrated in FIG. 1.

FIG. 1 is a side view illustrating a configuration of an optical element of an embodiment according to the present invention. FIG. 2 is an exploded side view illustrating four blocks constituting an optical block used in the optical element illustrated in FIG. 1. FIG. 3 is a perspective view illustrating the configuration (three-dimensional structure) of the optical element illustrated in FIG. 1. In each of the following drawings, for the convenience of description, an xyz orthogonal coordinate system is indicated as needed.

The optical element 1A of the embodiment is an optical element configured to use light with a predetermined wavelength as object light which is an object of transmission condition control, and a predetermined axis as a light transmission axis Ax, and is configured to include an optical block 10, a first wavelength selection filter 23, and a second wavelength selection filter 24. The optical block 10 is formed by a material through which light in a wavelength range including a wavelength of the object light as an object of transmission condition control is transmitted, and is configured such that the object light is transmitted along a direction of the light transmission axis Ax. In FIG. 1, the direction of the light transmission axis Ax coincides with a positive direction of a z-axis. The transmission conditions for the object light controlled by the optical element 1A are, for example, a wavelength and an incident angle of the object light transmitted through the optical block 10.

The first wavelength selection filter 23 includes an interference filter having predetermined light transmission wavelength properties (wavelength selection properties), and is provided on a first filter surface 13 set inside the optical block 10. The first filter surface 13 is set such that a normal line thereof forms an angle α with the light transmission axis Ax.

The second wavelength selection filter 24 includes an interference filter having predetermined light transmission wavelength properties, is located on a rear side of the light transmission axis Ax with respect to the first wavelength selection filter 23, and is provided on a second filter surface 14 set inside the optical block 10. The second filter surface 14 is set such that a normal line thereof forms the angle α with the light transmission axis Ax, and is in non-parallel, has the opposite inclination direction, and forms an angle 2α with the first filter surface 13.

Here, the angle α, indicating an inclination angle of the first and second filter surfaces 13 and 14 on which the first and second wavelength selection filters 23 and 24 are disposed, with the light transmission axis Ax, is set as a positive angle (α>0°) such that the filter surfaces 13 and 14 are not in parallel with each other. The inclination directions of the first and second filter surfaces 13 and 14 are opposite to each other as described above (in the example of FIG. 1, positive and negative directions of an x-axis). The first and second filter surfaces 13 and 14 which are non-parallel with each other and on which the first and second wavelength selection filters 23 and 24 are disposed, are set to be a flat surface, not a lens surface or a curved surface.

FIG. 2 illustrates a specific configuration example of the optical element 1A illustrated in FIG. 1, in particular, the optical block 10 which integrally supports the first and second wavelength selection filters 23 and 24 used in the optical element 1A.

A light incident surface 11, which is a surface located on a front side in the optical block 10, is formed to be a plane perpendicular to the light transmission axis Ax, and on the light incident surface 11, an antireflection film 21 for the object light with a predetermined wavelength is formed. A light emitting surface 12, which is a surface located on a rear side in the optical block 10, is similarly formed to be a plane perpendicular to the light transmission axis Ax, and on the light emitting surface 12, an antireflection film 22 for the object light with a predetermined wavelength is formed. At this time, the light incident surface 11 and the light emitting surface 12 of the optical block 10 are planes in parallel with each other. A reflection control film such as the antireflection films 21 and 22 on the light incident surface 11 and the light emitting surface 12, respectively, may be omitted if there is no need thereof.

Specifically, the optical block 10 in the configuration example is constituted by combining four blocks of an incidence-side block 30, a first filter block 35, a second filter block 40, and an emission-side block 45 in this order from a front side of the light transmission axis Ax (light incident surface 11 side), as the configuration thereof is illustrated in exploded manner in a z-axis direction in FIG. 2. These four blocks 30, 35, 40, and 45 are blocks of the same material and in the same shape formed such that each of the blocks has a first surface and a second surface opposed to each other and in non-parallel with each other.

In these blocks 30, 35, 40, and 45, the first surface of each block is formed to be a plane perpendicular to the light transmission axis Ax with a normal line thereof coinciding with the light transmission axis Ax. The second surface of each block is formed such that a normal line thereof forms the angle α with the light transmission axis Ax. At this time, the second surface of each block is a plane inclined at the angle α in the x-axis direction with respect to a plane perpendicular to the light transmission axis Ax.

The first surface 31 of the incidence-side block 30 is the light incident surface 11, and the antireflection film 21 is formed on the first surface 31. The second surface 32 of the incidence-side block 30 is connected to the second surface 37 of the first filter block 35, and a connection surface therebetween is the first filter surface 13 set inside the optical block 10. In FIG. 2, the first wavelength selection filter 23 is formed on the second surface 37 of the first filter block 35. The first surface 36 of the first filter block 35 is connected to the first surface 41 of the second filter block 40.

The second surface 42 of the second filter block 40 is connected to the second surface 47 of the emission-side block 45, and a connection surface therebetween is the second filter surface 14 set inside the optical block 10. In FIG. 2, the second wavelength selection filter 24 is formed on the second surface 42 of the second filter block 40. The first surface 46 of the emission-side block 45 is the light emitting surface 12, and the antireflection film 22 is formed on the first surface 46. In the above configuration, the first and second wavelength selection filters 23 and 24 are, for example, band-pass filters having the same wavelength selection properties (light transmission wavelength properties).

In the above configuration, regarding positions where the first and second wavelength selection filters are formed, in general, the first wavelength selection filter 23 may be formed on the second surface 37 of the first filter block 35, or on the second surface 32 of the incidence-side block 30. Similarly, the second wavelength selection filter 24 may be formed on the second surface 42 of the second filter block 40 or on the second surface 47 of the emission-side block 45.

Effects of the optical element 1A of the embodiment will be described.

In the optical element 1A illustrated in FIG. 1 to FIG. 3, the optical block 10, including an optical material which transmits object light with a predetermined wavelength λ, and the first wavelength selection filter 23 and the second wavelength selection filter 24, which are two interference filters for wavelength selection integrally provided with the optical block 10, constitute the optical element 1A. In the optical element 1A, a predetermined axis in the optical block 10 (for example, a central axis or a symmetric axis of the optical block 10) is set as the light transmission axis Ax. Further, regarding an arrangement configuration of the first and second wavelength selection filters 23 and 24 with respect to the optical block 10, the first wavelength selection filter 23 is disposed on the first filter surface 13 of which the normal line forms the angle α with the light transmission axis Ax, and the second wavelength selection filter 24 is disposed on the second filter surface 14 of which the normal line forms the angle α with the light transmission axis Ax and which is in non-parallel, has the opposite inclination direction, and forms the angle 2α with the first filter surface 13.

As described above, by disposing the first and second wavelength selection filters 23 and 24 inside the optical block 10 so as to form the angle 2α with each other and fixing the filters with the optical block 10, the optical element 1A is realized which is highly reliable in terms of environmental resistance, vibration resistance, and the like, and capable of stably controlling transmission conditions for the object light. In addition, by combining and using wavelength properties in light transmission in each of the first and second wavelength selection filters 23 and 24 disposed in non-parallel with each other, control of the transmission conditions for the object light can be preferably realized, for example, by selectively transmitting a light component of the object light, the light component having a particular wavelength range and incident angle, based on a difference in an angle dependency of light transmission properties between the first and second wavelength selection filters 23 and 24 exhibited when changing an incident angle of the object light.

In addition, in the optical element 1A of the above configuration, regarding the optical block 10 in which the first and second wavelength selection filters 23 and 24 are integrally provided, specifically, four blocks of the incidence-side block 30, the first filter block 35, the second filter block 40, and the emission-side block 45, which are formed of the same material and in the same shape, constitute the optical block 10. In the optical block 10, the first surface 31 of the incidence-side block 30 is the light incident surface 11, the second surface 32 of the incidence-side block 30 is connected to the second surface 37 of the first filter block 35, the first surface 36 of the first filter block 35 is connected to the first surface 41 of the second filter block 40, the second surface 42 of the second filter block 40 is connected to the second surface 47 of the emission-side block 45, and the first surface 46 of the emission-side block 45 is the light emitting surface 12.

Further, in the above configuration, the first wavelength selection filter (first interference filter) 23 is provided using a connection surface between the second surface 37 of the first filter block 35 and the second surface 32 of the incidence-side block 30 as the first filter surface 13 set inside the optical block 10. In addition, the second wavelength selection filter (second interference filter) 24 is provided using a connection surface between the second surface 42 of the second filter block 40 and the second surface 47 of the emission-side block 45 as the second filter surface 14 set inside the optical block 10. As described above, by constituting the optical block 10 which integrally supports the first and second wavelength selection filters 23 and 24 with the four blocks 30, 35, 40, and 45 of the same material and in the same shape as constitutional components, it is possible to realize the optical element 1A which has a simple configuration and high mass-productivity, and is inexpensive.

In the optical element 1A of the above configuration, each of the first surfaces of the incidence-side block 30, the first filter block 35, the second filter block 40, and the emission-side block 45 is preferably formed to be a plane perpendicular to the light transmission axis Ax. In this case, both of the light incident surface 11 corresponding to the first surface 31 of the incidence-side block 30, and the light emitting surface 12 corresponding to the first surface 46 of the emission-side block 45 are planes perpendicular to the light transmission axis Ax. In the above configuration, it is possible to make the object light enter inside the optical block 10, for example, without refracting the object light at the light incident surface 11.

The optical element 1A of the above configuration employs a configuration in which the first and second wavelength selection filters 23 and 24 are integrally supported by the optical block 10. The above configuration provides high rigidity as a structure, and relative positions of the first and second wavelength selection filters 23 and 24 therein are not changed, in comparison to a configuration where the first and second wavelength selection filters 23 and 24 are separately provided, and the like. Accordingly, long-term reliability in terms of environmental resistance, vibration resistance, and the like, is improved in the optical element 1A. Further, in the above configuration, the non-parallel arrangement of the wavelength selection filters 23 and 24 is fixed by assembling the optical block 10 from the four blocks when manufacturing the optical element 1A. Accordingly, there is no need to perform filter alignment and the like, when the optical element 1A is disposed on an optical path of the object light.

Preferably, a glass block which transmits the object light with a predetermined wavelength λ is used as the optical block 10. Examples of a material of the glass block include optical glass materials such as synthetic quartz, fused quartz, and BK7, solid organic materials such as plastic, and ceramic materials such as sapphire, calcium fluoride, and magnesium fluoride. In general, as a material of the optical block 10, a material may be used which is solid, capable of integrally holding the wavelength selection filters 23 and 24, and transparent for a target wavelength range including the wavelength λ of the object light.

Regarding the first and second wavelength selection filters 23 and 24 in the optical element 1A, specifically, a configuration can be used in which the first wavelength selection filter 23 and the second wavelength selection filter 24 are band-pass filters having the same wavelength selection properties (light transmission wavelength properties) in the optical element 1A, for example. By using band-pass filters having the same properties as the first and second wavelength selection filters 23 and 24 as described above, it is possible to constitute and manufacture the optical element 1A preferably and easily.

As the first and second wavelength selection filters 23 and 24, interference filters having different wavelength selection properties from each other may be used. As the interference filter, for example, a short-pass filter or a long-pass filter may be used in addition to the band-pass filter which transmits light in a predetermine wavelength range. Such an interference filter can be constituted by a dielectric multilayer film, for example. In this case, a material generally used for making an optical thin film can be used as a material for constituting the dielectric multilayer film, and examples thereof include $TiO_2$, $HfO_2$, $Nb_2O_5$, $ZrO_2$, $Y_2O_3$, $Al_2O_3$, $SiO_2$, $MgF_2$, and $CaF$.

In the optical element 1A of the embodiment, the first filter surface 13, which is located on the front side of the light transmission axis Ax and on which the first wavelength selection filter 23 is provided, is set to be located inside the optical block 10. In the above configuration, there occurs an increase in change in the light transmission wavelength properties in the first wavelength selection filter 23 with respect to the change in the incident angle of the object light, and accordingly, transmission conditions for the object light can be preferably controlled. In the above embodiment, the second filter surface 14 is similarly set to be located inside the optical block 10.

The angle 2α formed by the filter surfaces 13 and 14 on which the first and second wavelength selection filters 23 and 24 are respectively disposed is preferably set to be an angle which is not too large, and for example, less than 30°. That is, when the angle between the wavelength selection filters 23 and 24 is increased, although a transmittancedecreasing effect on the change in the angle of the object light increases, there occurs a need to very severely control an arrangement angle of the optical element 1A to be incorporated in the optical system. In addition, when the angle between the wavelength selection filters 23 and 24 is increased, there occurs an increase in size of the optical block 10 which holds the filters integrally, and thereby a space occupied by the optical element 1A in the optical system increases. It is preferable to appropriately set the inclination angle α of the first and second filter surfaces 13 and 14 in consideration of these points.

The optical element 1A may be configured such that an antireflection film for the object light with a predetermined wavelength is formed on at least one of the first surface 31 of the incidence-side block 30 as the light incident surface 11 in the optical block 10, and the first surface 46 of the emission-side block 45 as the light emitting surface 12 therein. In FIG. 1, a configuration is illustrated in which the antireflection films 21 and 22 are formed for improving light use efficiency on both of the light incident surface 11 and the light emitting surface 12. However, such an antireflection film may not be provided if there is no need thereof.

The optical element 1A having the above configuration may be configured to function, for example, as an aperture which selectively transmits a light component of the object light, the light component of a predetermined incident condition (for example, a directional light component having a particular wavelength and incident angle). Further, the optical element 1A may be configured to function as a band-pass filter which selectively transmits a light component of the object light, the light component of a predetermined wavelength range. The functions, the use, and the effect thereof which the above-described optical element 1A has by itself, will be specifically described later.

Furthermore, the optical element 1A may be configured to function as an optical shutter which performs ON/OFF switching of the transmission of the object light in the optical block 10, by changing a relative angle between the light transmission axis Ax in the optical block 10 in which the first and second wavelength selection filters 23 and 24 are integrally provided, and a light incident axis of the object light with respect to the optical block 10.

That is, in the optical element 1A having the above configuration, with the use of a combination of light transmission wavelength properties in each of the first wavelength selection filter 23 and the second wavelength selection filter 24 disposed in non-parallel with each other, a relative angle θ between the light transmission axis Ax in the optical block 10 and the light incident axis of the object light is changed, which makes it possible to preferably perform the ON/OFF switching of the transmission of the object light as the transmission conditions therefor in the optical block 10.

For example, the light transmission wavelength properties in each wavelength selection filter are set such that, when the wavelength of the object light is λ and the light transmission axis Ax and the light incident axis coincide with each other (relative angle θ=0°), both the first and second wavelength selection filters 23 and 24 transmit the object light of the wavelength λ. At this time, the optical element 1A is in an ON state for the transmission of the object light. By contrast, the relative angle (switching angle) θ for the ON/OFF switching of the transmission of the object light is appropriately set such that the optical element 1A is brought into an OFF state for the transmission of the object light when the light transmission axis Ax and the light incident axis forms the relative angle θ. By doing so, the optical element 1A having the configuration illustrated in FIG. 1 to FIG. 3 functions as an optical shutter. The relation between the change in the relative angle θ and the switching between ON state/OFF state of the transmission of the object light may be set reversely to the relation described above. Regarding the OFF state of the transmission of the object light, the light transmittance is not necessarily 0%, and the light may be transmitted at a transmittance which does not affect the function of the optical system.

Figure 4:
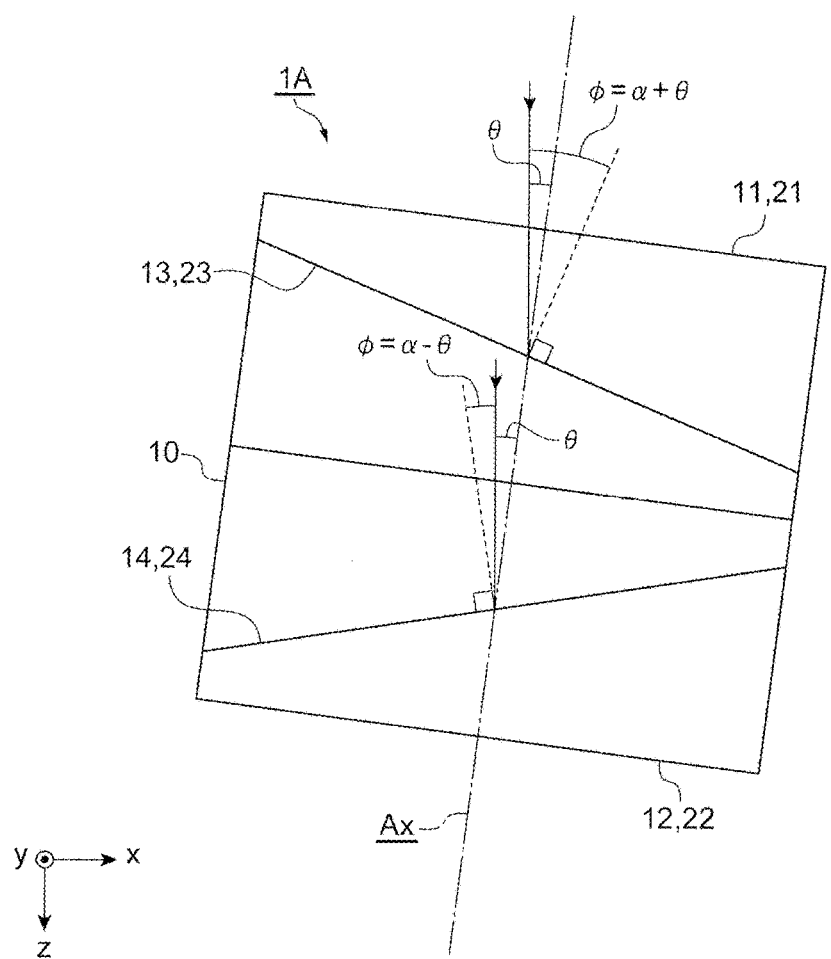
FIG. 4 is a view illustrating a shutter operation performed when the optical element illustrated in FIG. 1 is used as an optical shutter.

FIG. 4 is a view illustrating a shutter operation performed when the optical element 1A illustrated in FIG. 1 to FIG. 3 is used as an optical shutter. In FIG. 1, the ON state is illustrated in which the light transmission axis Ax in the optical block 10 and the light incident axis of the object light with the wavelength λ with respect to the optical block 10 coincide with each other, and the object light is transmitted through the optical element 1A, and in FIG. 4, the OFF state is illustrated in which the relative angle is changed such that the light transmission axis (dot-dashed line) Ax and the light incident axis (solid arrow) form an angle θ, and the object light is not transmitted through the optical element 1A.

At this time, since the inclination directions of the first and second filter surfaces 13 and 14 with respect to the light transmission axis Ax are opposite to each other, an angle formed by the normal line of the first filter surface 13 on which the first wavelength selection filter 23 is disposed and the light incident axis of the object light is $\phi=\alpha+\theta$, and on the other hand, an angle formed by the normal line of the second filter surface 14 on which the second wavelength selection filter 24 is disposed and the light incident axis of the object light is $\phi=\alpha-\theta$. Then, by the change in light transmission wavelength properties in each of the first and second wavelength selection filters 23 and 24 which occurs when the relative angle θ between the light transmission axis Ax and the light incident axis is switched as described above, the ON/OFF switching of the transmission of the object light in the optical element 1A is performed.

In the optical element 1A of the above configuration, the light transmission wavelength properties in each of the wavelength selection filters 23 and 24 are changed when changing the relative angle θ between the light transmission axis Ax in the optical block 10 in which the wavelength selection filters 23 and 24 are provided, and the light incident axis of the object light with respect to the optical block 10. As described above, in the configuration in which the first and second wavelength selection filters 23 and 24 are disposed in non-parallel with each other, the light transmission wavelength properties in the first wavelength selection filter 23 and the light transmission wavelength properties in the second wavelength selection filter 24 are changed with respect to the change in the relative angle θ under different wavelength conditions from each other.

Therefore, by appropriately combining the light transmission wavelength properties and the change therein in each of the first wavelength selection filter 23 and the second wavelength selection filter 24, it is possible to preferably control the light transmission wavelength properties of the element as a whole and to preferably realize the ON/OFF switching of the transmission of the object light in the optical element 1A which functions as an optical shutter.

Particularly when the optical element 1A is used as an optical shutter, ON/OFF control of the object light is performed by using not the change in the light transmission properties in one wavelength selection filter but a combination of the changes in the light transmission properties in each of the two wavelength selection filters 23 and 24. In the above configuration, it is possible to reduce an amount of change in the relative angle θ between the light transmission axis Ax and the light incident axis, which is necessary to perform the ON/OFF switching of the transmission of the object light, and accordingly, it is possible to perform the ON/OFF control of the object light at a high speed, and to secure long-teen reliability of the optical element 1A. In addition, it is also possible to reduce the size of a component in the optical element 1A having the above configuration, and various applications are expected, for example, an optical shutter may be provided in a processing laser head attached to a robot arm.

Regarding the change in the relative angle θ between the light transmission axis Ax in the optical block 10 and the light incident axis of the object light in a case where the optical element 1A of the above configuration is used as an optical shutter, specifically, for example, a configuration can be used in which the relative angle between the light transmission axis and the light incident axis is changed by driving the optical block 10 to change a direction of the light transmission axis. Alternatively, a configuration can be used in which the relative angle between the light transmission axis and the light incident axis is changed by driving a light guide optical system for guiding the object light to the optical block 10 to change a direction of the light incident axis.

Figure 5:
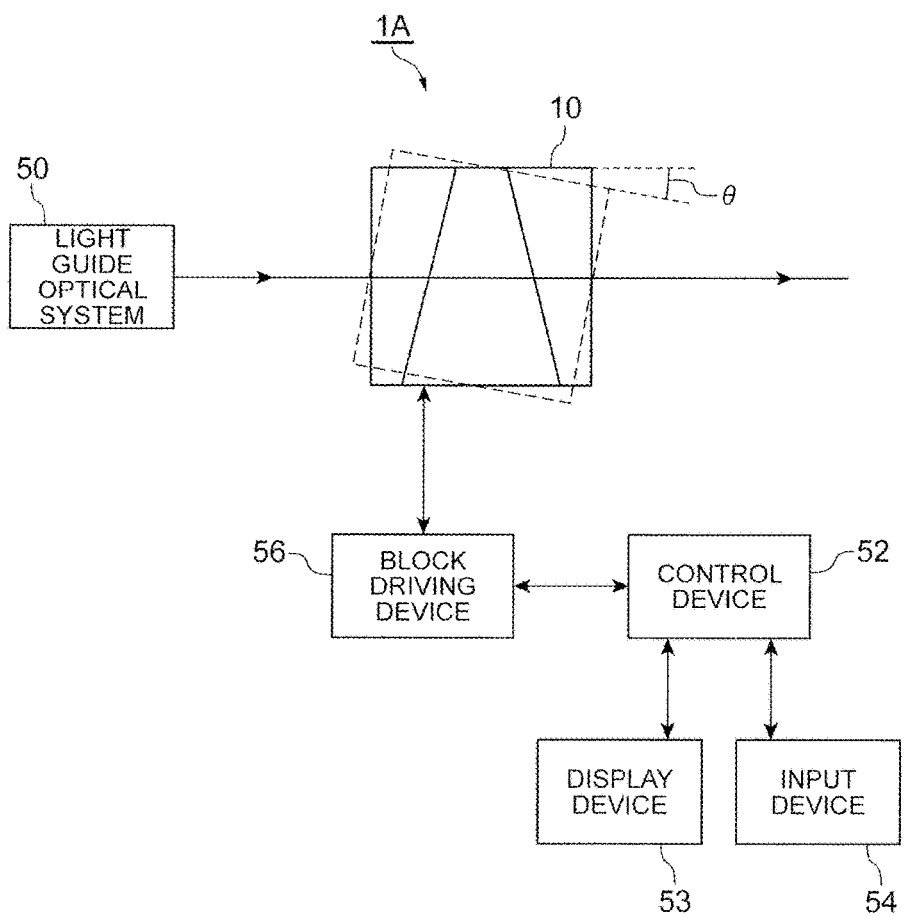
FIG. 5 is a diagram illustrating a configuration of the optical element using a block driving device.

FIG. 5 is a diagram illustrating a configuration of the optical element 1A as an optical shutter using a block driving device. In this configuration example, a light guide optical system 50 is provided for the optical block 10 of the optical element 1A for guiding the object light of the ON/OFF control to the optical block 10. In addition, a block driving device 56 is provided for the optical block 10, the driving device driving the optical block 10 to change the direction of the light transmission axis, and the relative angle θ between the light transmission axis in the optical block 10 and the light incident axis of the object light is changed by the driving device 56.

A control device 52, for example including a computer, is provided for the block driving device 56. The control device 52 controls a driving operation of the optical block 10 performed by the block driving device 56, thereby controlling an ON/OFF operation for the transmission of the object light in the optical element 1A. A display device 53, used for displaying information regarding the ON/OFF control of the object light for an operator, and an input device 54, used for input by the operator of information, an instruction, and the like necessary for the ON/OFF control, are connected to the control device 52.

Figure 6:
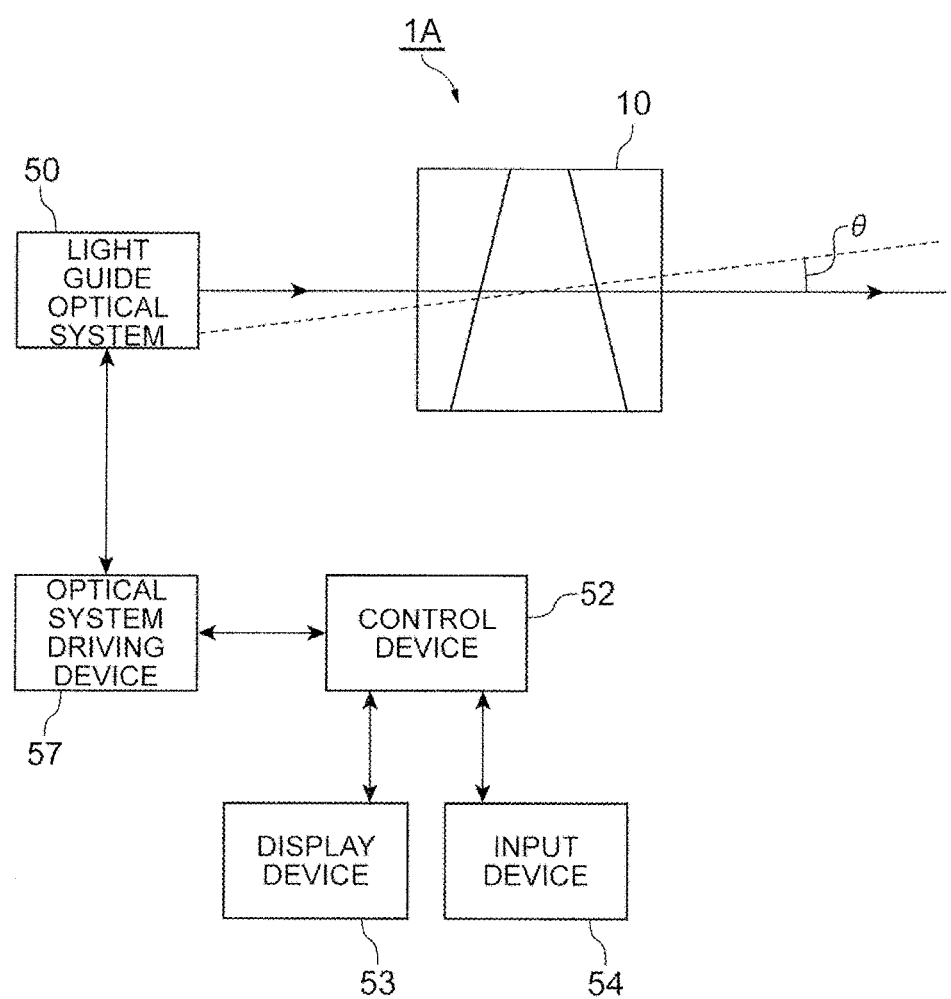
FIG. 6 is a diagram illustrating a configuration of the optical element using an optical system driving device.

FIG. 6 is a diagram illustrating a configuration of the optical element 1A as an optical shutter using an optical system driving device. In this configuration example, an optical system driving device 57 is provided for the light guide optical system 50 of guiding the object light, the driving device driving the light guide optical system 50 to change the direction of the light incident axis, and the relative angle θ between the light transmission axis in the optical block 10 and the light incident axis of the object light is changed by the driving device 57. The control device 52 controls a driving operation of the light guide optical system 50 performed by the optical system driving device 57, thereby controlling an ON/OFF operation for the transmission of the object light in the optical element 1A. The display device 53 and the input device 54 are connected to the control device 52.

As described above, when the optical element 1A is used as an optical shutter, it is possible to preferably realize the change of the relative angle θ between the light transmission axis Ax and the light incident axis, and the ON/OFF control of the transmission of the object light by the change, by providing the block driving device 56 as block driving means which drives the optical block 10 or the optical system driving device 57 as optical system driving means which drives the light guide optical system 50 for the object light. In a case where the direction of the light incident axis is changed by driving the light guide optical system 50, examples of an optical component of the light guide optical system 50 driven by the optical system driving device 57 include a reflective mirror, a prism, and a lens. Both of the block driving device and the optical system driving device may be used to drive both of the optical block 10 and the light guide optical system 50.

Particularly in the optical element 1A having the above configuration, an amount of change in the relative angle θ between the light transmission axis and the light incident axis, which is necessary for the ON/OFF control of the object light, is reduced as described above, and therefore, it is possible to reduce an amount of driving when the optical block 10 or the light guide optical system 50 is driven by the driving device. In addition, when the amount of driving of the optical block 10 or the light guide optical system 50 is reduced as described above, wear or the like of a movable part is prevented from occurring at ON/OFF switching of the object light, and thereby reliability, durability, and the like of the shutter in long-term use are improved. Regarding the control of the operations of the driving devices 56 and 57, the driving devices may be operated by a manual operation or the like performed by the operator, without providing the control device 52.

A specific configuration example and optical properties of the optical element 1A of the above embodiment will be described. Here, a description will be given for, as an example, the properties of the optical element 1A when the wavelength of the object light is λ=532 nm, the inclination angle in each of the first and second wavelength selection filters 23 and 24 is α=10°, and the angle formed by the wavelength selection filters 23 and 24 is 2α=20°. As the first and second wavelength selection filters 23 and 24, band-pass filters having the same properties are used.

The following light transmission wavelength properties illustrated in the graphs in FIG. 7 to FIG. 11 are those obtained as a result of simulations. In the following description, regarding the inclination angle θ of the light incident axis of the object light with respect to the light transmission axis Ax in the optical block 10, a direction in which an angle formed by the normal line of the first filter surface 13 and the light incident axis for the first wavelength selection filter 23 located on a front side is changed to satisfy φ=α+θ is defined as a positive direction of the angle θ, and a direction in which the angle is changed to satisfy φ=α−θ is defined as a negative direction of the angle θ.

Figure 7:
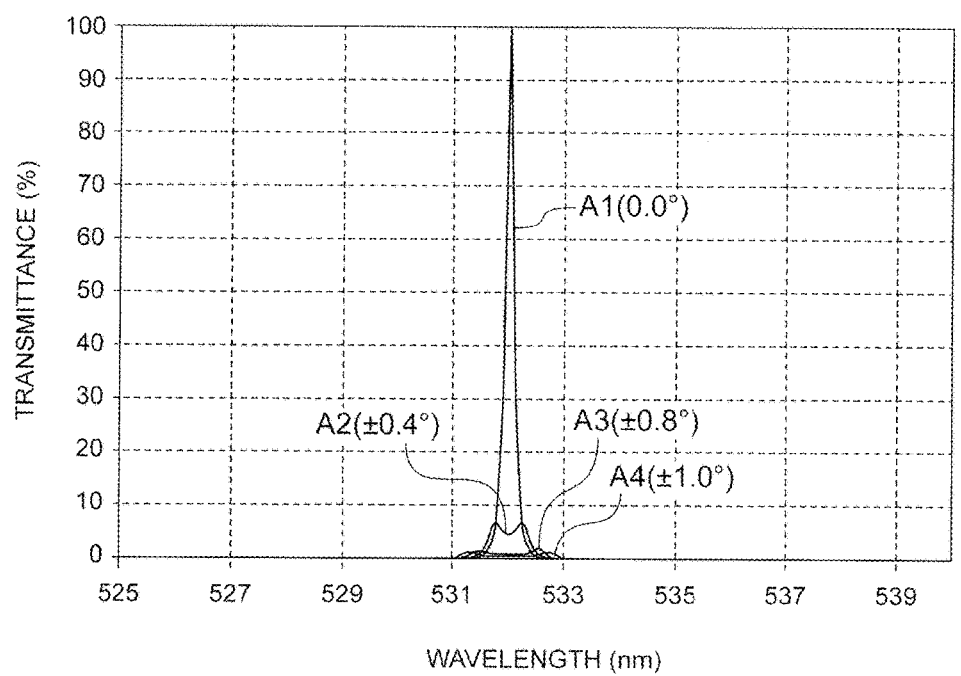
FIG. 7 is a graph illustrating light transmission wavelength properties in the optical element.

FIG. 7 is a graph illustrating light transmission wavelength properties in the optical element 1A. In the graph in FIG. 7, a horizontal axis indicates wavelength (nm) and a vertical axis indicates light transmittance (%). In FIG. 7, a graph A1 indicates light transmission properties when the relative angle between the light transmission axis and the light incident axis (incident angle of the object light with respect to the optical block 10) is θ=0.0°, a graph A2 indicates light transmission properties when θ=+0.4° or −0.4°, a graph A3 indicates light transmission properties when θ=+0.8° or −0.8°, and a graph A4 indicates light transmission properties when θ=+1.0° or −1.0°.

As illustrated in the graph in FIG. 7, in a case where θ=0.0°, which means that the light incident axis of the object light coincides (or is in parallel) with the light transmission axis (central axis of the optical block 10) Ax in the optical block 10, the optical element 1A exhibits transmittance of substantially 100% for the object light with a wavelength $\lambda$=532 nm. By contrast, the transmittance of the object light is decreased with the increase in the inclination angle $\theta$ of the light incident axis with respect to the light transmission axis Ax, and when the angle $\theta$=±0.8°, the transmittance is 1% or less.

As described above, according to the optical element 1A of the above configuration, transmission conditions such as ON/OFF of the transmission of the object light or selection of a light component to be transmitted can be preferably controlled by slightly changing the relative angle $\theta$ between the light transmission axis Ax and the light incident axis. In addition, in the above optical element 1A, areas of the light incident surface 11 and the light emitting surface 12 of the optical block 10 directly serve as the effective area for controlling transmission conditions. Accordingly, even in a case where a beam diameter of the object light is large, the transmission conditions for the object light can be preferably controlled in a similar manner.

Figure 8:
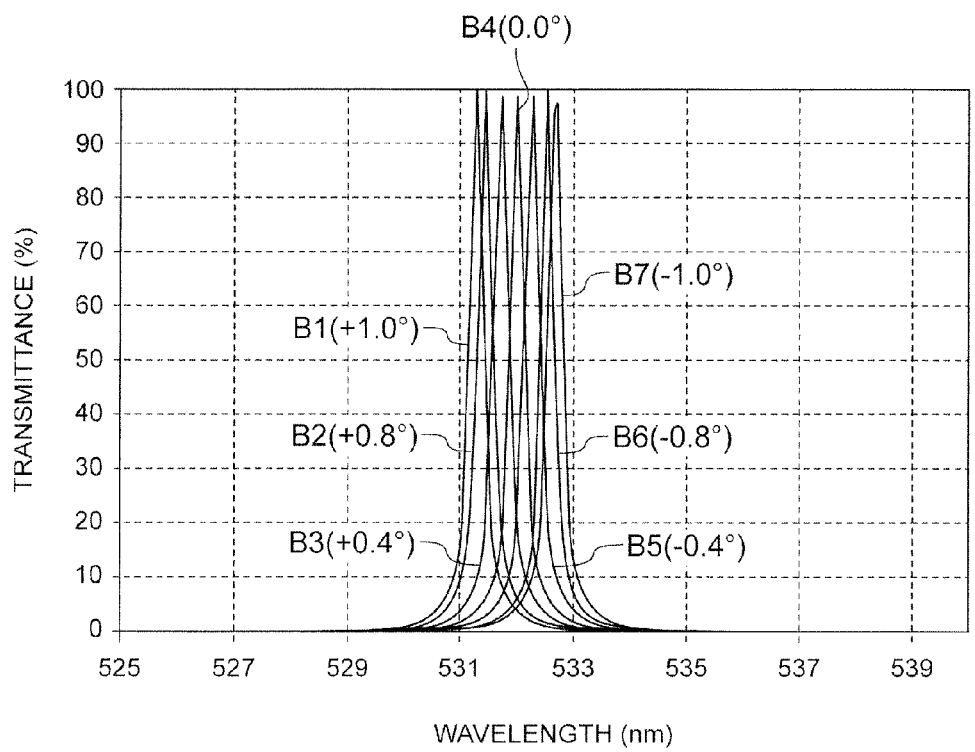
FIG. 8 is a graph illustrating light transmission wavelength properties in a single wavelength selection filter.

FIG. 8 is a graph illustrating light transmission wavelength properties in a single wavelength selection filter used as the first and second wavelength selection filters 23 and 24 in the optical element 1A. In FIG. 8, a leftmost graph B1 indicates light transmission properties when the inclination angle of the light incident axis (relative angle between the light transmission axis and the light incident axis) is $\theta$=+1.0°, a graph B2 indicates light transmission properties when $\theta$=+0.8°, a graph B3 indicates light transmission properties when $\theta$=+0.4°, a central graph B4 indicates light transmission properties when $\theta$=0.0°, a graph B5 indicates light transmission properties when $\theta$=−0.4°, a graph B6 indicates light transmission properties when $\theta$=−0.8°, and a rightmost graph B7 indicates light transmission properties when $\theta$=−1.0°.

As illustrated in the graph in FIG. 8, when the inclination angle $\theta$ of the light incident axis is changed to a positive direction, an incident angle $\phi$ (see FIG. 4) of the object light for the wavelength selection filter increases, and thereby a transmission wavelength band in the band-pass filter shifts to a short-wavelength side. On the other hand, when the inclination angle $\theta$ of the light incident axis is changed to a negative direction, the incident angle $\phi$ of the object light decreases, and thereby the transmission wavelength band in the band-pass filter shifts to a long-wavelength side.

Figure 9:
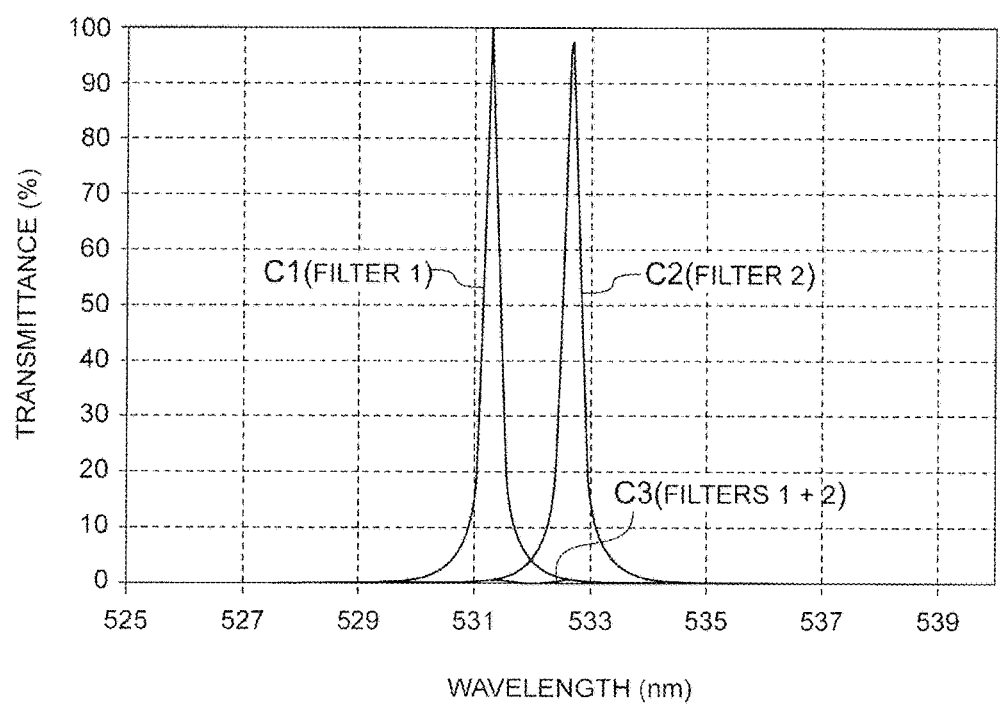
FIG. 9 is a graph illustrating light transmission wavelength properties in the first and second wavelength selection filters and the optical element including the first and second wavelength selection filters.

FIG. 9 is a graph illustrating light transmission wavelength properties in the first and second wavelength selection filters 23 and 24, and the optical element 1A as a whole including the filters. Here, the light transmission properties when the inclination angle $\theta$ of the light incident axis is set at +1.0° in the positive direction are illustrated. In addition, in FIG. 9, a graph C1 indicates light transmission properties in the first wavelength selection filter 23 (filter 1), and a graph C2 indicates light transmission properties in the second wavelength selection filter 24 (filter 2). Further, a graph C3 indicates light transmission properties in the optical element 1A as a whole including the first and second wavelength selection filters 23 and 24 (filters 1+2).

As illustrated in the graph in FIG. 9, when the inclination angle $\theta$ of the light incident axis is changed to the positive direction, an incident angle of the object light for the first wavelength selection filter 23 increases to satisfy $\phi=\alpha+\theta$, and a transmission wavelength band thereof shifts to a short-wavelength side. On the other hand, at this time, an incident angle of the object light for the second wavelength selection filter 24 decreases to satisfy $\phi=\alpha-\theta$, and a transmission wavelength band thereof shifts to a long-wavelength side. Accordingly, in the light transmission properties in the optical element 1A as a whole obtained by combining the light transmission properties in the first and second wavelength selection filters 23 and 24, a transmission wavelength band of one of the wavelength selection filters 23 and 24 is counteracted by a transmission wavelength band of the other, and as a result, a transmission wavelength band of the optical element 1A as a whole disappears as illustrated in the graph C3 in FIG. 9. In the optical element 1A of the above configuration, control of the transmission conditions for the object light is realized by the change in the light transmission wavelength properties described above.

In the above optical element 1A, a filter structure with high rigidity is realized by integrating the first and second wavelength selection filters 23 and 24 in the optical block 10, and when the first and second wavelength selection filters 23 and 24 are disposed inside the optical block 10 as described above, an optical effect, which will be described below, can be obtained thereby in addition to the structural effect.

Figure 10:
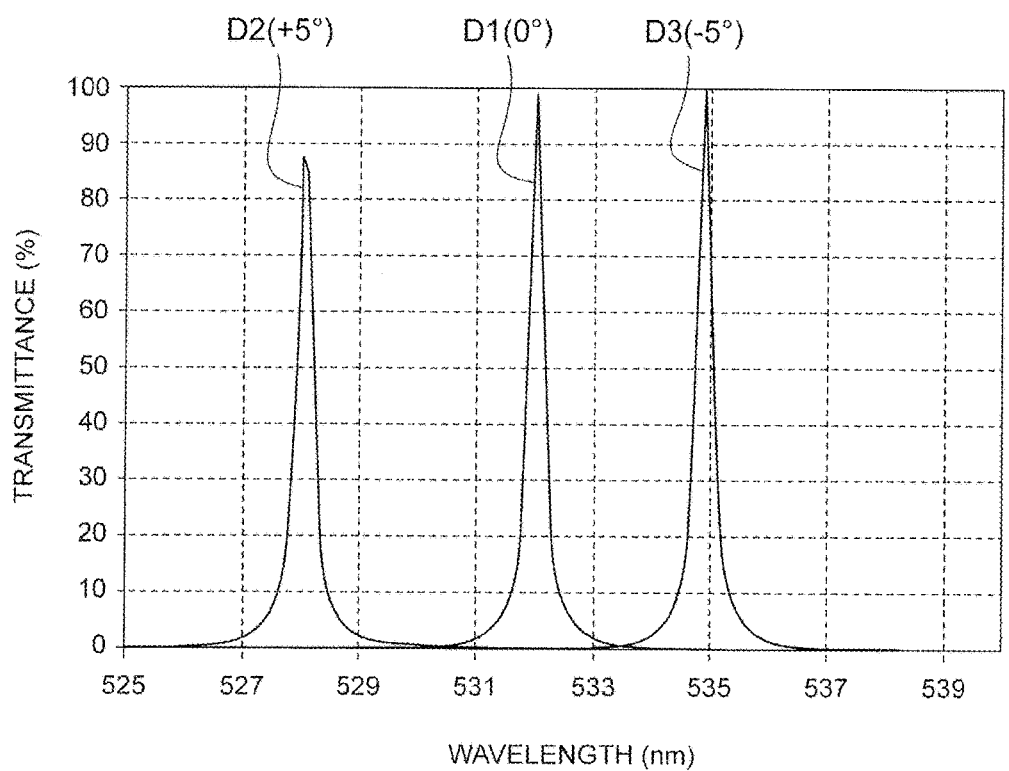
FIG. 10 is a graph illustrating light transmission wavelength properties in the wavelength selection filter.

FIG. 10 is a graph illustrating light transmission wavelength properties when the wavelength selection filter (the first wavelength selection filter 23 or the second wavelength selection filter 24) is disposed inside the optical block 10 made of glass. In FIG. 10, a graph D1 indicates light transmission properties when the inclination angle of the light incident axis is $\theta$=0°, a graph D2 indicates light transmission properties when $\theta$=+5°, and a graph D3 indicates light transmission properties when $\theta$=−5°.

Figure 11:
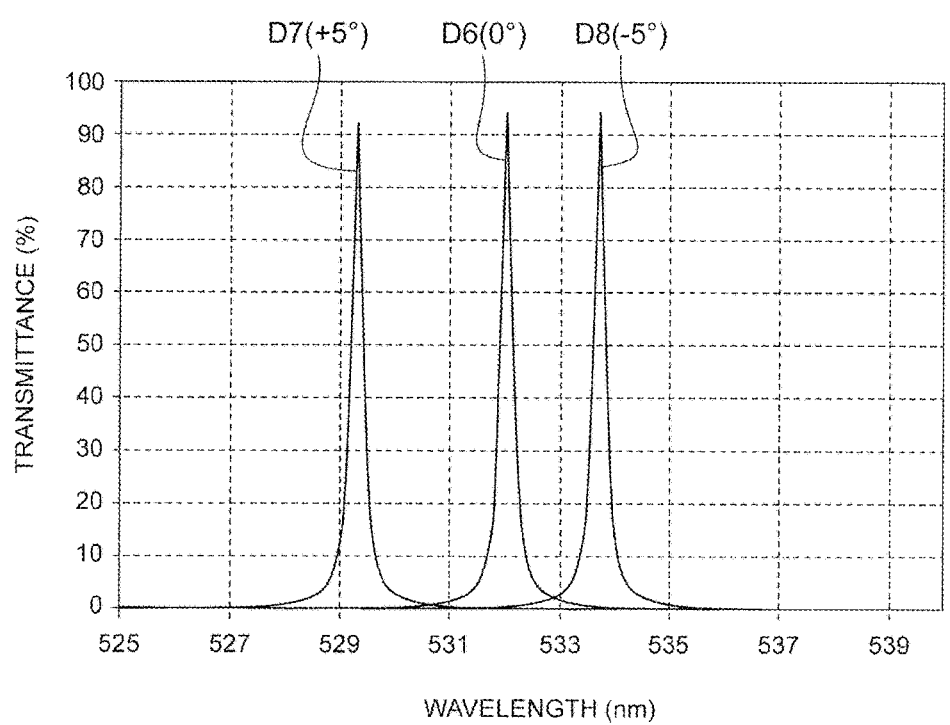
FIG. 11 is a graph illustrating light transmission wavelength properties in the wavelength selection filter.

FIG. 11 is a graph illustrating light transmission wavelength properties when the wavelength selection filter is disposed in the air. In FIG. 11, a graph D6 indicates light transmission properties when the inclination angle of the light incident axis is $\theta$=0°, a graph D7 indicates light transmission properties when $\theta$=+5°, and a graph D8 indicates light transmission properties when $\theta$=−5°.

As illustrated in graphs in FIG. 10 and FIG. 11, when the inclination angle of the light incident axis is changed in a range of $\theta$=±5°, a transmission wavelength band is changed in a wavelength range of 528 nm to 535 nm in the configuration in which the wavelength selection filter is disposed in the glass. On the other hand, in the configuration in which the wavelength selection filter is disposed in the air, a transmission wavelength band is changed in a wavelength range of 529 nm to 534 nm. That is, an amount of shift in wavelengths of the transmission wavelength band with respect to the change in the inclination angle $\theta$ of the light incident axis is increased by disposing the wavelength selection filter inside the glass block. Therefore, according to the configuration in which the first and second wavelength selection filters 23 and 24 are disposed inside the optical block 10, the change in the light transmission wavelength properties in each of the wavelength selection filters, and an effect of controlling the transmission conditions for the object light obtained thereby are emphasized. For example, in the above configuration, it is possible to strongly attenuate the object light other than that having a particular incident angle to prevent transmission thereof.

A specific configuration example, a manufacturing method and the like of the optical element 1A of the above embodiment will be described with reference to FIG. 2, and FIG. 12 to FIG. 18. FIG. 12 and FIG. 13 are views illustrating an example of the method for manufacturing the optical element. In this configuration example, first, four blocks of the same material and in the same shape, which serve as the incidence-side block 30, the first filter block 35, the second filter block 40, and the emission-side block 45 in the optical block 10, are each prepared as an inclined substrate with an inclination angle of α=10°. These four blocks are each prepared, for example, as illustrated in (a) in FIG. 12, as a rod-shaped prism member 60 having a first surface 61 and a second surface 62.

Next, as illustrated in (b) in FIG. 12, coating is performed on the second surface (prism inclined surface) 62 of a prism member 60 serving as the first filter block 35 and on the second surface 62 of a prism member 60 serving as the second filter block 40 among the four prism members 60 to form wavelength selection filters (interference filters) 63 which include dielectric multilayer films and serve as the first and second wavelength selection filters 23 and 24, respectively.

Figure 14:
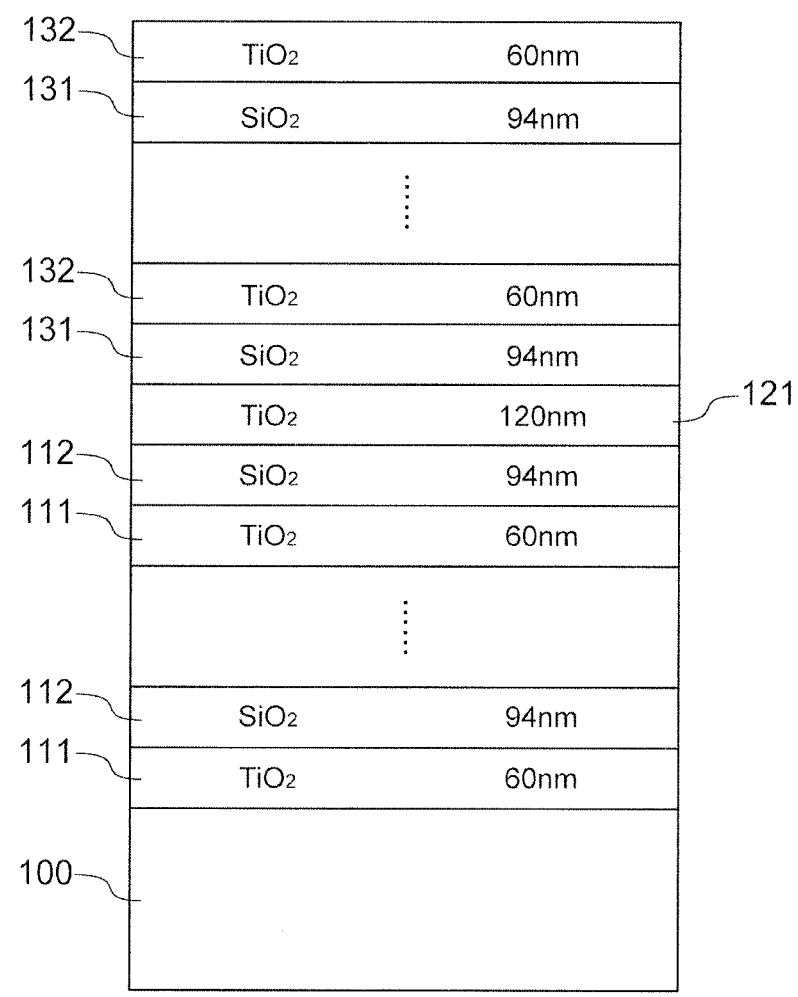
FIG. 14 is a diagram illustrating an example of a configuration of the wavelength selection filter.

Here, FIG. 14 illustrates an example of a configuration of the wavelength selection filter used as the first and second wavelength selection filters 23 and 24. In FIG. 14, for each layer constituting the wavelength selection filter, a material and a physical film thickness (nm) are illustrated. The wavelength selection filter illustrated in FIG. 14 is constituted by forming, on a block 100 serving as a base, seven layers each including a $TiO_2$ film 111 with a thickness of 60 nm and a $SiO_2$ film 112 with a thickness of 94 nm, forming one layer of a $TiO_2$ film 121 with a thickness of 120 nm thereon, and further forming seven layers each including a $SiO_2$ film 131 with a thickness of 94 nm and a $TiO_2$ film 132 with a thickness of 60 nm thereon.

When formation of the wavelength selection filter 63 on the second surface 62 of the prism member 60 is finished, as illustrated in (a) in FIG. 13, the second surface of a prism member 64, which is a prism member 60 on which the wavelength selection filter 63 has been formed, and the second surface of a prism member 65, which is a prism member 60 on which the wavelength selection filter 63 has not been formed, are adhered to each other to obtain a block member 66, and the number of block members 66 thus prepared is two. These two block members 66 constitute a front side portion and a rear side portion of the optical block 10, respectively.

Subsequently, as illustrated in (b) in FIG. 13, the two block members 66 are adhered to each other, block members are cut out at an appropriate dimension, as illustrated by cutting lines 67, and thereby the optical element 1A is obtained which integrally includes the optical block 10 including the incidence-side block 30, the first filter block 35, the second filter block 40, and the emission-side block 45, and the first and second wavelength selection filters 23 and 24. For the adhesion of each block (prism member), for example, an adhesive or optical contact is used.

The antireflection films 21 and 22 may be formed for improving light use efficiency respectively on the first surface 31 of the incidence-side block 30 serving as the light incident surface 11 and the first surface 46 of the emission-side block 45 serving as the light emitting surface 12 among the four block members, as illustrated in FIG. 2. It is preferable to form such an antireflection film on a block member or a prism member before the optical element is cut out therefrom, as with the case of the formation of the wavelength selection filter.

Figure 15:
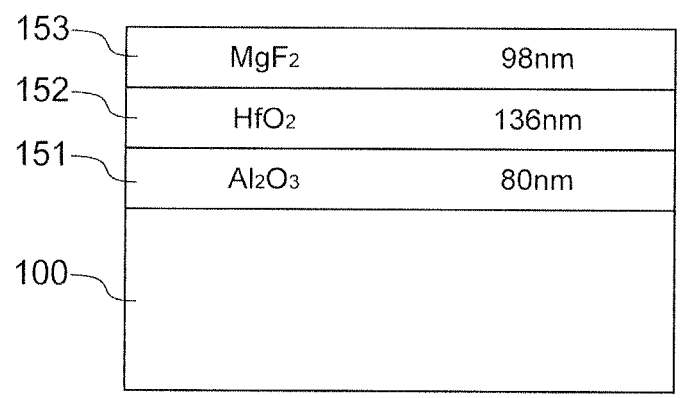
FIG. 15 is a diagram illustrating an example of a configuration of an antireflection film.

Here, FIG. 15 illustrates an example of a configuration of an antireflection film (antireflection filter) used as the antireflection films 21 and 22. In FIG. 15, for each layer constituting the antireflection film, a material and a physical film thickness (nm) are illustrated. The antireflection film illustrated in FIG. 15 is constituted by forming, on a block 100 serving as a base, one layer each of an $Al_2O_3$ film 151 with a thickness of 80 nm, a $HfO_2$ film 152 with a thickness of 136 nm, and a $MgF_2$ film 153 with a thickness of 98 nm.

In the configuration example described above, the configuration has been described in which the optical block 10 is assembled with four blocks which have been processed into a predetermined dimension in advance, however, there is no limitation to the configuration, and for example, a method may be used in which the wavelength selection filter or the like is formed and the blocks are adhered to each other, and then processing such as polishing is performed to the optical block such that the inclination angle of the filter is adjusted to be a predetermined angle. Further, in the above configuration example, the configuration has been described in which a plurality of optical elements 1A are manufactured by using rod-shaped prism members, however, there is no limitation to the configuration, and a single optical element 1A may be manufactured by using prism members cut out into a predetermined size.

FIG. 16, FIG. 17, and FIG. 18 are views illustrating another example of the method for manufacturing the optical element. In this configuration example, first, four blocks of the same material and in the same shape, which serve as the incidence-side block 30, the first filter block 35, the second filter block 40, and the emission-side block 45 in the optical block 10, are each prepared as a prism array substrate in which a plurality of prisms are formed and arranged in an array. These four array substrates are each prepared, for example, as illustrated in (a) in FIG. 16, as a prism array member 70 having a first surface 71 in a planar shape and a second surface 72 which is a serrate surface (prism array surface).

Next, as illustrated in (b) in FIG. 16, coating is performed on the second surface (prism inclined surface) 72 of a prism array member 70 serving as the first filter block 35 and on the second surface 72 of a prism array member 70 serving as the second filter block 40 among the four prism array members 70 to form wavelength selection filters (interference filters) 73 which include dielectric multilayer films and serve as the first and second wavelength selection filters 23 and 24, respectively.

When formation of the wavelength selection filter 73 is finished, as illustrated in (a) in FIG. 17, the second surface of a prism array member 74, which is a prism array member 70 on which the wavelength selection filter 73 has been formed, and the second surface of a prism array member 75, which is a prism array member 70 on which the wavelength selection filter 73 has not been formed, are adhered to each other to obtain a block array member 76, and the number of block array members 76 thus prepared is two. These two block array members 76 constitute a front side portion and a rear side portion of the optical block 10, respectively.

Subsequently, as illustrated in (b) in FIG. 17, the two block array members 76 are adhered to each other. In addition, as illustrated in (a) and (b) in FIG. 18, block members are cut out from the adhered block array members 76 at an appropriate dimension as illustrated by cutting lines 77, and thereby the optical element 1A is obtained which integrally includes the optical block 10 including the incidence-side block 30, the first filter block 35, the second filter block 40, and the emission-side block 45, and the first and second wavelength selection filters 23 and 24.

In this configuration example, the configuration has been described in which a single block is cut out from the block array and used as the optical element 1A, however, there is no limitation to the configuration, and as illustrated in (a) in FIG. 18, the block array may be used as it is as an optical element which functions as an optical element array 1B. The optical element in a block array shape as described above has a planar shape in comparison to the optical element in a block shape, and therefore, space saving can be achieved.

The functions and the use of the optical element 1A according to the above embodiment and configuration examples will be further described. In the optical element 1A of the above configuration in which the first and second wavelength selection filters 23 and 24 disposed inside the optical block 10 in non-parallel with each other are used, it is possible to control transmission conditions for the object light in various ways by using optical properties described above for FIG. 7 to FIG. 11.

For example, the light transmission wavelength properties illustrated in FIG. 7 indicate that the transmittance of a light component with a particular wavelength of $\lambda=532$ nm is high in a case where the relative angle between the light transmission axis Ax in the optical block 10 and the light incident axis of the object light is $\theta=0°$ or near $0°$. Therefore, when the optical element 1A is used alone, the element can function as an optical filter which selectively transmits a light component with a particular wavelength range and a particular incident angle, and excludes light components with the other wavelength ranges and the other incident angles.

With the use of the optical element 1A thus described, it is possible to easily cut out, for example, from the object light from a scattered light source, a light beam which is close to a monochromatic beam and which has high directivity. The above technique with which a directional monochromatic light beam is cut out from diffused light is expected to be widely applied, for example, to simplification of a structure of a spectrometer including a complicated mechanism, realization of a two-dimensional spectroscope, realization of a simple monochromatic light source, or a configuration in which collimated light is cut out without using a complicated lens system to realize imaging with a deep focal depth. In addition, the above optical element 1A is a solid structure using the optical block 10 such as a glass block, and the reliability thereof can be secured even when used in an environment with much vibration, for example, outdoors.

The optical element 1A can be used as a band-pass filter which cuts out a light component of the object light, the light component in a particular wavelength range. Here, conventional band-pass filters include two types of filters, i.e. a dielectric multilayer film filter and an absorption-type filter (so-called color glass filter). The absorption-type filter transmits light with a particular wavelength band without depending on incident angles of object light. However, it is difficult to realize a filter having a narrow half width of the transmission wavelength band with the absorption-type filter, and transmitted light has a wavelength component having a certain width.

On the other hand, the dielectric multilayer film filter has a high degree of freedom for designing a transmission wavelength band, and a half width of the transmission wavelength band can be narrowed, however, a wavelength range in a transmission band changes depending on an incident angle of object light for the filter. Therefore, when the object light is filtered by the dielectric multilayer film filter, a wavelength component of the transmitted light varies depending on an incident angle of the diffused light. By contrast, in the optical element 1A having the above configuration in which the two wavelength selection filters 23 and 24 disposed in non-parallel with each other are used in combination, it is possible to hold the degree of freedom for designing, for example, a half width of the transmission wavelength band, and to cut out only a light component having a particular wavelength and incident angle.

The optical element 1A can be used as an aperture which cuts out a light component of the object light, the light component with a particular incident condition (for example, a particular incident angle range). It is possible to cut out directional light with a conventional aperture, however, angle components, light amounts, and the like, which can be cut out are limited, for example, by an arrangement relation such as proximity of a scattered light source to the aperture, or a diameter size of the aperture. In particular, the aperture blocks a major portion of diffused light and uses only a light beam passing through an opening portion, and therefore, light use efficiency thereof is low. By contrast, in the optical element 1A having the above configuration, an effective diameter and an effective area of the element directly function as an opening, and therefore, light use efficiency thereof can be increased in comparison to that of conventional apertures.

(a) to (d) in FIG. 19 are views illustrating examples of use of the optical element 1A as an aperture. In the configuration example illustrated in (a) in FIG. 19, light Lout having a particular wavelength range is taken out with directivity by the optical element 1A from object light Lin, which is scattered light including multi-wavelength light components. In the configuration example illustrated in (b) in FIG. 19, the optical element 1A is provided for a light source 80 such as an LD which supplies object light Lin having a spread of an angle, thereby taking out light Lout only having a narrow angle range.

In the configuration example illustrated in (c) in FIG. 19, the optical element array 1B including a plurality of optical elements arranged in an array is disposed for a display device 81 such that the optical elements respectively correspond to pixels in the display device 81, thereby realizing a display which performs display with directivity. In the configuration example illustrated in (d) in FIG. 19, the optical element 1A is provided for a photodetector 82 such as a photodiode, and object light Lin such as scattered light is filtered by the optical element 1A such that the photodetector 82 only detects light Lout having a particular incident angle.

The size of the optical element 1A is as follows, for example, in a three-dimensional structure illustrated in FIG. 3, a width in an x-axis direction is 30 mm, a width in a y-axis direction is 30 mm, and a thickness in a z-axis direction is 20 mm. Such an optical element can be incorporated as a general optical component into various types of optical systems. Configuration conditions for the element such as the size of the optical element are not limited to those described above, and may be appropriately set according to the specific use thereof or the like.

The optical element according to the present invention is not limited to the embodiment and the configuration examples described above, and may be modified in various ways. For example, regarding the light transmission wavelength properties in the first and second wavelength selection filters constituting the optical element and the function of the optical element obtained thereby, there is no limitation to the configuration described above, and specifically, various configurations may be used.

The optical element according to the embodiment is configured to include (1) an optical block through which object light for transmission condition control is transmitted along a light transmission axis direction, (2) a first wavelength selection filter including an interference filter provided on a first filter surface set such that a normal line forms an angle α with the light transmission axis, inside the optical block, and (3) a second wavelength selection filter being located on a rear side of the light transmission axis with respect to the first wavelength selection filter, and including an interference filter provided on a second filter surface set such that a normal line forms an angle α with the light transmission axis, the second filter surface being in non-parallel, having an opposite inclination direction, and forming an angle 2α with the first filter surface, inside the optical block, and (4) the optical block is constituted by combining four blocks of an incidence-side block, a first filter block, a second filter block, and an emission-side block in this order from a front side of the light transmission axis, and the four blocks are blocks of the same material and in the same shape formed such that each of the blocks has a first surface and a second surface opposed to each other, and the normal line of the second surface forms an angle α with the light transmission axis, (5) the first surface of the incidence-side block is a light incident surface, the second surface of the incidence-side block is connected to the second surface of the first filter block, the first surface of the first filter block is connected to the first surface of the second filter block, the second surface of the second filter block is connected to the second surface of the emission-side block, and the first surface of the emission-side block is a light emitting surface, (6) the first wavelength selection filter is formed on the second surface of the first filter block or on the second surface of the incidence-side block, and the second wavelength selection filter is formed on the second surface of the second filter block or on the second surface of the emission-side block.

In the optical element having the above configuration, the first surfaces of the incidence-side block, the first filter block, the second filter block, and the emission-side block are preferably formed to be planes perpendicular to the light transmission axis. In this case, the light incident surface corresponding to the first surface of the incidence-side block, and the light emitting surface corresponding to the first surface of the emission-side block are planes perpendicular to the light transmission axis. In the above configuration, it is possible to make the object light enter inside the optical block, for example, without refracting the object light at the light incident surface.

Regarding the first and second wavelength selection filters, the optical element may have a configuration in which the first wavelength selection filter and the second wavelength selection filter are band-pass filters having the same wavelength selection property. By using band-pass filters with the same properties as the first and second wavelength selection filters as described above, it is possible to constitute the optical element preferably and easily. As the first and second wavelength selection filters, interference filters having different wavelength selection properties from each other may be used. As the interference filter, for example, a short-pass filter and a long-pass filter may be used in addition to the band-pass filter.

The optical element may be configured such that an antireflection film for the object light with a predetermined wavelength is formed on at least one of the first surface of the incidence-side block as the light incident surface, and the first surface of the emission-side block as the light emitting surface in the optical block. Here, such an antireflection film may not be provided if there is no need thereof.

The optical element having the above configuration may be configured to function, for example, as an aperture selectively transmitting a light component, with a predetermined incident condition, of the object light. The optical element may be configured to function as a band-pass filter selectively transmitting a light component, in a predetermined wavelength range, of the object light. Alternatively, the optical element may be configured to function as an optical shutter performing, as a transmission condition for the object light in the optical block, ON/OFF switching of the transmission by changing a relative angle between the light transmission axis in the optical block in which the first and second wavelength selection filters are integrally provided, and the light incident axis of the object light for the optical block.

INDUSTRIAL APPLICABILITY

The present invention can be used as an optical element which is highly reliable in terms of environmental resistance and the like, and capable of controlling transmission conditions for object light with a simple configuration.

REFERENCE SIGNS LIST

1A—optical element, 10—optical block, 11—light incident surface, 12—light emitting surface, 13—first filter surface, 14—second filter surface, 21, 22—antireflection film, 23—first wavelength selection filter, 24—second wavelength selection filter, Ax—light transmission axis, 1B—optical element array, 30—incidence-side block, 31—first surface, 32—second surface, 35—first filter block, 36—first surface, 37—second surface, 40—second filter block, 41—first surface, 42—second surface, 45—emission-side block, 46—first surface, 47—second surface, 50—light guide optical system, 52—control device, 53—display device, 54—input device, 56—block driving device, 57—optical system driving device, 60, 64, 65—prism member, 61—first surface, 62—second surface, 63—wavelength selection filter, 66—block member, 67—cutting line, 70, 74, 75—prism array member, 71—first surface, 72—second surface, 73—wavelength selection filter, 76—block array member, 77—cutting line.

The invention claimed is:

1. An optical element comprising:
   an optical block through which object light for transmission condition control is transmitted along a light transmission axis direction;
   a first wavelength selection filter including an interference filter provided on a first filter surface set such that a normal line forms an angle α with the light transmission axis, inside the optical block, and;
   a second wavelength selection filter being located on a rear side of the light transmission axis with respect to the first wavelength selection filter, and including an interference filter provided on a second filter surface set such that a normal line forms an angle α with the light transmission axis, the second filter surface being in non-parallel, having an opposite inclination direction, and forming an angle 2α with the first filter surface, inside the optical block, wherein
   the optical block is constituted by combining four blocks of an incidence-side block, a first filter block, a second filter block, and an emission-side block in this order from a front side of the light transmission axis, and the four blocks are blocks of the same material and in the same shape formed such that each of the blocks has a first surface and a second surface opposed to each other, and the normal line of the second surface forms an angle α with the light transmission axis, the first surface of the incidence-side block is a light incident surface, the second surface of the incidence-side block is integrally connected to the second surface of the first filter block, the first surface of the first filter block is integrally connected to the first surface of the second filter block, the second surface of the second filter block is integrally connected to the second surface of the emission-side block, and the first surface of the emission-side block is a light emitting surface, the first wavelength selection filter is formed on the second surface of the first filter block or on the second surface of the incidence-side block, the second wavelength selection filter is formed on the second surface of the second filter block or on the second surface of the emission-side block, and the first wavelength selection filter and the second wavelength selection filter are integrally supported with the incidence-side block, the first filter block, the second filter block and the emission-side block.

2. The optical element according to claim 1, wherein the first surfaces of the incidence-side block, the first filter block, the second filter block, and the emission-side block are formed to be planes perpendicular to the light transmission axis.

3. The optical element according to claim 1, wherein the first wavelength selection filter and the second wavelength selection filter are band-pass filters with the same wavelength selection property.

4. The optical element according to claim 1, wherein an antireflection film is formed on at least one of the first surface of the incidence-side block as the light incident surface, and the first surface of the emission-side block as the light emitting surface in the optical block.

5. The optical element according to claim 1, functioning as an aperture selectively transmitting a light component, with a predetermined incident condition, of the object light.

6. The optical element according to claim 1, functioning as a band-pass filter selectively transmitting a light component, in a predetermined wavelength range, of the object light.

* * * * *